(12) United States Patent
Park et al.

(10) Patent No.: US 11,716,892 B2
(45) Date of Patent: *Aug. 1, 2023

(54) VISIBLE LIGHT SENSOR EMBEDDED ORGANIC LIGHT EMITTING DIODE DISPLAY PANELS AND DISPLAY DEVICES INCLUDING THE SAME

(71) Applicant: Samsung Electronics Co., Ltd., Suwon-si (KR)

(72) Inventors: Kyung Bae Park, Hwaseong-si (KR); Sung Young Yun, Suwon-si (KR); Gae Hwang Lee, Seongnam-si (KR); Yong Wan Jin, Seoul (KR); Chui Joon Heo, Busan (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 49 days.

This patent is subject to a terminal disclaimer.

(21) Appl. No.: 17/227,845

(22) Filed: Apr. 12, 2021

(65) Prior Publication Data
US 2021/0257420 A1 Aug. 19, 2021

Related U.S. Application Data

(63) Continuation of application No. 16/590,886, filed on Oct. 2, 2019, now Pat. No. 10,978,523.

(30) Foreign Application Priority Data

Oct. 8, 2018 (KR) .................. 10-2018-0120055

(51) Int. Cl.
H01L 27/32 (2006.01)
H01L 31/105 (2006.01)
(Continued)

(52) U.S. Cl.
CPC ........ *H01L 27/3234* (2013.01); *G06V 10/143* (2022.01); *G06V 40/1318* (2022.01);
(Continued)

(58) Field of Classification Search
CPC ............. H01L 27/3234; H01L 27/3211; H01L 27/323; H01L 31/105; H01L 27/3244;
(Continued)

(56) References Cited

U.S. PATENT DOCUMENTS 9,600,708 B2 3/2017 Kim et al.
9,666,635 B2 5/2017 Erhart et al.
(Continued)

FOREIGN PATENT DOCUMENTS

CN 107451576 A 12/2017
CN 107609538 A 1/2018
(Continued)

OTHER PUBLICATIONS

I. Fujieda et al., "Fingerprint input based on scattered-light detection" Applied Optics, vol. 36, No. 35, pp. 9152-9156, Dec. 10, 1997.
(Continued)

*Primary Examiner* — Karen Kusumakar
(74) *Attorney, Agent, or Firm* — Harness, Dickey & Pierce, P.L.C.

(57) ABSTRACT

An OLED display panel may include a substrate, an OLED light emitter on the substrate and configured to emit light, and a visible light sensor on the substrate and configured to detect at least a portion of the emitted light based on reflection of the portion of the emitted light from a recognition target. The visible light sensor is in a non-light emitting region adjacent to the OLED light emitter so as to be horizontally aligned with the OLED light emitter in a horizontal direction extending parallel to an upper surface of
(Continued)

the substrate, or between the substrate and a non-light emitting region adjacent to the OLED light emitter such that the visible light sensor is vertically aligned with the non-light emitting region in a vertical direction extending perpendicular to the upper surface of the substrate.

20 Claims, 17 Drawing Sheets

(51) Int. Cl.
*G06V 10/143* (2022.01)
*G06V 40/13* (2022.01)

(52) U.S. Cl.
CPC ........ *H01L 27/323* (2013.01); *H01L 27/3211* (2013.01); *H01L 31/105* (2013.01)

(58) Field of Classification Search
CPC ............... H01L 27/307; H01L 27/3227; H01L 27/3218; H01L 51/5203; G06K 9/2018; G06K 9/0004; G06F 3/0412; G06F 21/32; G09G 2360/147
See application file for complete search history.

(56) References Cited

U.S. PATENT DOCUMENTS

| | | | |
|---|---|---|---|
| 9,864,448 B2 | 1/2018 | Bae et al. | |
| 9,891,746 B2 | 2/2018 | Bae et al. | |
| 9,996,179 B2 | 6/2018 | Bae et al. | |
| 2010/0177060 A1 | 7/2010 | Han | |
| 2013/0278577 A1 | 10/2013 | Beon et al. | |
| 2015/0224343 A1 | 8/2015 | Couture et al. | |
| 2015/0331508 A1* | 11/2015 | Nho | H01L 27/323 345/173 |
| 2017/0351364 A1 | 12/2017 | Kim et al. | |
| 2018/0101271 A1 | 4/2018 | Tsai et al. | |
| 2018/0158877 A1 | 6/2018 | Zeng et al. | |
| 2018/0165496 A1 | 6/2018 | Cheng et al. | |
| 2019/0013368 A1 | 1/2019 | Chung et al. | |
| 2019/0114460 A1 | 4/2019 | Zhu et al. | |

FOREIGN PATENT DOCUMENTS

| | | | |
|---|---|---|---|
| JP | 2004016407 A | 1/2004 | |
| JP | 2008-191611 A | 8/2008 | |
| JP | 2008-209557 A | 9/2008 | |
| JP | 2013-73965 A | 4/2013 | |
| JP | 5780970 B2 | 9/2015 | |
| KR | 2000-0013995 A | 3/2000 | |
| KR | 10-1418760 B1 | 7/2014 | |
| KR | 2017-0000103 A | 1/2017 | |
| KR | 2017-0049731 A | 5/2017 | |
| KR | 10-1754065 B1 | 7/2017 | |
| KR | 10-1758047 B1 | 7/2017 | |
| KR | 2017-0123578 A | 11/2017 | |
| WO | WO-2017/098758 A1 | 6/2017 | |

OTHER PUBLICATIONS

Extended European Search Report dated Feb. 12, 2020 for corresponding European Application No. 19200233.5.
Japanese Office Action dated Jun. 6, 2023 for corresponding Japanese Application No. 2019-185002, and English-language translation thereof.
Chinese Office Action dated Jun. 6, 2023 for corresponding Chinese Application No. 20190938569.5, and English-language translation thereof.

* cited by examiner

VISIBLE LIGHT SENSOR EMBEDDED ORGANIC LIGHT EMITTING DIODE DISPLAY PANELS AND DISPLAY DEVICES INCLUDING THE SAME

CROSS-REFERENCE TO RELATED APPLICATIONS

This application is a continuation of U.S. application Ser. No. 16/590,886, filed Oct. 2, 2019, which claims priority to and the benefit of Korean Patent Application No. 10-2018-0120055 filed in the Korean Intellectual Property Office on Oct. 8, 2018, the entire contents of each of which are incorporated herein by reference.

BACKGROUND

1. Field

This disclosure relates to organic light emitting diode display panels and display devices including the same, and more particularly to visible light sensor embedded organic light emitting diode display panels configured to implement biometric recognition and devices including the same.

2. Description of the Related Art

Organic light emitting diode (OLED) display panels have merits of excellent luminance, driving voltage, and response rate characteristics and implementing color images, so they are being employed for various display devices.

Meanwhile, recently, display devices have increasingly implemented biometric recognition technologies via which certain biometric information or gesture information is extracted by one or more devices to authenticate a person in financial, health care, and mobile fields. Particularly, leading smartphone companies are focusing on adapting fingerprint and iris recognition technologies.

Since Apple Inc. took over AuthenTech, which was a manufacturer of semiconductive sensors for finger scans, Apple Inc. have been consistently mounting fingerprint sensors in iPhones® and iPads®. US 2015-0331508 also discloses technologies of forming a near-infrared sensor for fingerprint recognition on the same plane as an OLED emitter. That is, a separate near-infrared emitter and near-infrared detector are utilized for fingerprint recognition.

Since the near-infrared emitter and the near-infrared detector are formed on the same plane as the OLED emitter in US 2015-0331508, an aperture ratio of the OLED emitter including such near-infrared emitter and the near-infrared detector may be decreased compared with a conventional OLED emitter having no near-infrared emitter and near-infrared detector. The aperture ratio decrease of the OLED emitter may have a large influence on display characteristics of a mobile display device including the OLED emitter, particularly, a smart phone having a small display area.

SUMMARY

Some example embodiments provide a visible light sensor embedded OLED display panel (also referred to herein as simply an "OLED display panel") configured to implement biometric recognition without an effect on an aperture ratio of an OLED emitter or reducing or minimizing the effect, thereby improving performance of the OLED display panel, for example improving the display characteristics of a display device including the OLED display panel.

Some example embodiments provide a display device that includes a visible light sensor embedded OLED display panel configured to implement biometric recognition without an effect on an aperture ratio of an OLED display part or reducing or minimizing the effect, thereby improving performance of the OLED display panel, for example improving the display characteristics of a display device including the OLED display panel.

An OLED display panel according to some example embodiments includes a substrate; an OLED light emitter on the substrate, the OLED light emitter being configured to display images and to emit light for biometric recognition; and a visible light sensor configured to detect light reflected by a recognition target after being emitted by the OLED light emitter, wherein the visible light sensor is positioned in or under a non-light emitting region of the OLED light emitter.

By employing the OLED light emitter as a light source for the visible light sensor, the OLED display panel may be configured to perform biometric recognition without a separate light source other than the OLED light emitter, so as to prevent an aperture ratio decrease of the OLED light emitter.

The OLED display panel may maintain the aperture ratio of the OLED light emitter at about 100% or may reduce or minimize the aperture ratio decrease by forming the visible light sensor in a non-light emitting region that does not affect the aperture ratio of the OLED light emitter based on the location of the visible light sensor, or by forming the visible light sensor in a stack structure under the non-light emitting region (e.g., between the non-light emitting region of the OLED light emitter and a substrate) or by forming the visible light sensor in a green pixel region of the OLED light emitter (e.g., replacing one or more green OLED light emitters in a pattern or array of green OLED light emitters of the OLED light emitter of the OLED display panel).

Accuracy or efficiency of biometric recognition provided by the aforementioned OLED display panels may be improved since the amount or intensity of the light emitted to perform biometric recognition is increased or maximized based on employing the biometric recognition sensor as a visible light sensor.

The visible light sensor may be formed of (e.g., may at least partially comprise) an organic material and thus may be bent or stretchable. Accordingly, the visible light sensor may contribute to easily realizing a flexible display device and thus improve portability and versatility of a display device that includes the OLED display panel.

According to some example embodiments, an OLED display panel may include a substrate, an OLED light emitter on the substrate, the OLED light emitter configured to emit light, and a visible light sensor on the substrate, the visible light sensor configured to detect at least a portion of the emitted light based on reflection of the portion of the emitted light from a recognition target. The visible light sensor may be in a non-light emitting region adjacent to the OLED light emitter so as to be horizontally aligned with the OLED light emitter in a horizontal direction extending parallel to an upper surface of the substrate, or between the substrate and a non-light emitting region that is adjacent to the OLED light emitter such that the visible light sensor is vertically aligned with the non-light emitting region in a vertical direction extending perpendicular to the upper surface of the substrate.

The visible light sensor may be configured to absorb light in an entirety of a wavelength spectrum of visible light.

The visible light sensor may include an organic photodiode including an organic material.

The visible light sensor may include an a-Si-based P-I-N photodiode, a poly-Si-based P-I-N photodiode, a CIGS (Cu—In—Ga—Se) photodiode, or a Cd—Te photodiode.

A display device may include the OLED display panel.

A method for performing biometric recognition of a user of a display device, the display device including the OLED display panel, may include driving the OLED light emitter to emit light and further driving the visible light sensor to detect at least a portion of the emitted light based on reflection of the portion of the emitted light from a recognition target that is a portion of the user, in response to a determination that the OLED light emitter is turned on, user access to the display device is disabled, and the recognition target is in a certain proximity to the OLED display panel. The method may include turning off the visible light sensor, granting user access to the display device, and driving the OLED light emitter to display an image, in response to a determination that recognition of the recognition target is completed via comparison of a reference recognition target image with an image of the recognition target generated based on an output signal of the visible light sensor in response to detecting the reflected portion of the emitted light.

The determination that the recognition target is in the certain proximity to the OLED display panel may be based on receiving a signal from a touch sensor of the OLED display panel.

The driving the OLED light emitter may include selectively driving a particular limited set of OLED light emitters of an array of OLED light emitters of the OLED display panel. The further driving the visible light sensor may include selectively driving a particular limited set of visible light sensors of an array of visible light sensors of the OLED display panel.

The determination that the recognition target is in the certain proximity to the OLED display panel may be based on receiving a signal from a touch sensor of the OLED display panel, the signal indicating a limited area, of a total area of a surface of the OLED display panel, that is in contact with the recognition target. The driving the OLED light emitter may include selectively driving the particular limited set of OLED light emitters that are a limited portion of the array of OLED light emitters that vertically overlap with the limited area in response to a determination that the recognition target is in contact with the limited area. The further driving the visible light sensor may include selectively the particular limited set of visible light sensors that are a limited portion of the array of visible light sensors that vertically overlap with the limited area in response to the determination that the recognition target is in contact with the limited area.

The OLED display panel may further include an infrared light emitter on the substrate, the infrared light emitter configured to emit infrared light, and an infrared light sensor on the substrate, the infrared light sensor configured to detect at least a portion of the emitted infrared light based on reflection of the portion of the emitted infrared light from a recognition target. The infrared light sensor may be in a separate non-light emitting region adjacent to the OLED light emitter, or between the substrate and a separate non-light emitting region that is adjacent to the OLED light emitter.

The OLED display panel may further include an array of OLED light emitters on the substrate, the array of OLED light emitters including the OLED light emitter; and an array of visible light sensors on the substrate, the array of visible light sensors including the visible light sensor. The array of OLED light emitters may extend through a first region of the OLED display panel, and the array of visible light sensors extends through a second region of the OLED display panel, the second region being smaller than the first region, such that the array of visible light sensors do not extend through at least a third region of the OLED display panel that includes at least one OLED light emitter of the array of OLED light emitters, and no visible light sensors.

The first region may extend over a total area of the OLED display panel, the second region may extend over a limited area of the OLED display panel, and the third region may extend between at least one side of the second region and at least one edge of the OLED display panel.

The third region may completely surround the second region and may be between all sides of the second region and all edges of the OLED display panel.

The OLED display panel may further include an array of infrared light emitters on the substrate, the array of infrared light emitters configured to emit infrared light; and an array of infrared light sensors on the substrate, the array of infrared light sensors configured to detect at least a portion of the emitted infrared light based on reflection of the portion of the emitted infrared light from a recognition target. The array of infrared light emitters and the array of infrared light sensors may extend through at least a portion of the first region.

The array of infrared light emitters and the array of infrared light sensors may not extend through the second region.

The array of infrared light emitters and the array of infrared light sensors may not extend through the third region.

According to some example embodiments, an OLED display panel may include a substrate, an OLED light emitter stack on the substrate, the OLED light emitter stack including a plurality of sub-pixels, including a red OLED sub-pixel, a green OLED sub-pixel, and a blue OLED sub-pixel, each of the red, green, and blue OLED sub-pixels configured to emit light; and a visible light sensor on the substrate, the visible light sensor configured to detect at least a portion of the emitted light based on reflection of the portion of the emitted light from a recognition target. The visible light sensor may be in a non-light emitting region of the OLED light emitter stack so as to be horizontally aligned with at least one adjacent OLED sub-pixel of the OLED light emitter stack in a horizontal direction extending parallel to an upper surface of the substrate, or between the substrate and a non-light emitting region of the OLED light emitter stack such that the visible light sensor is vertically aligned with the non-light emitting region of the OLED light emitter stack in a vertical direction extending perpendicular to the upper surface of the substrate.

The visible light sensor may be configured to absorb light in an entirety of a wavelength spectrum of visible light.

The visible light sensor may include an organic photodiode including an organic material.

The visible light sensor may include an a-Si-based P-I-N photodiode, a poly-Si-based P-I-N photodiode, a CIGS (Cu—In—Ga—Se) photodiode, or a Cd—Te photodiode.

The visible light sensor may be partially overlapped with at least one OLED sub-pixel of the OLED light emitter stack in the vertical direction.

The visible light sensor may include an organic photodiode including a lower electrode, an upper electrode, and a visible light absorption layer between the lower and upper electrodes. The lower electrode may be a reflecting electrode. The upper electrode may be a transparent electrode.

A display device may include the OLED display panel.

According to some example embodiments, an OLED display panel may include a substrate, a driver stack on the substrate, and an OLED light emitter stack on the driver stack. The OLED light emitter stack may include a plurality of sub-pixels configured to emit light and a visible light sensor, the plurality of sub-pixels including a red OLED sub-pixel, a green OLED sub-pixel, and a blue OLED sub-pixel, the visible light sensor configured to detect at least a portion of the emitted light based on reflection of the portion of the emitted light from a recognition target. The visible light sensor may be in a non-light emitting region of the OLED light emitter stack so as to be horizontally aligned with at least one adjacent OLED sub-pixel of the OLED light emitter stack in a horizontal direction extending parallel to an upper surface of the substrate, or in the green OLED sub-pixel.

The visible light sensor may be configured to absorb light in an entirety of a wavelength spectrum of visible light.

The visible light sensor may include an organic photodiode including an organic material.

The visible light sensor may include an a-Si-based photodiode, a poly-Si-based P-I-N photodiode, a CIGS (Cu—In-Ga—Se) photodiode, or a Cd—Te photodiode.

The visible light sensor may include an organic photodiode including a lower electrode, an upper electrode, and a visible light absorption layer between the lower and upper electrodes. The lower electrode may be a reflecting electrode. The upper electrode may be a transflective electrode.

A display device may include the OLED display panel.

DETAILED DESCRIPTION

Figure 1:
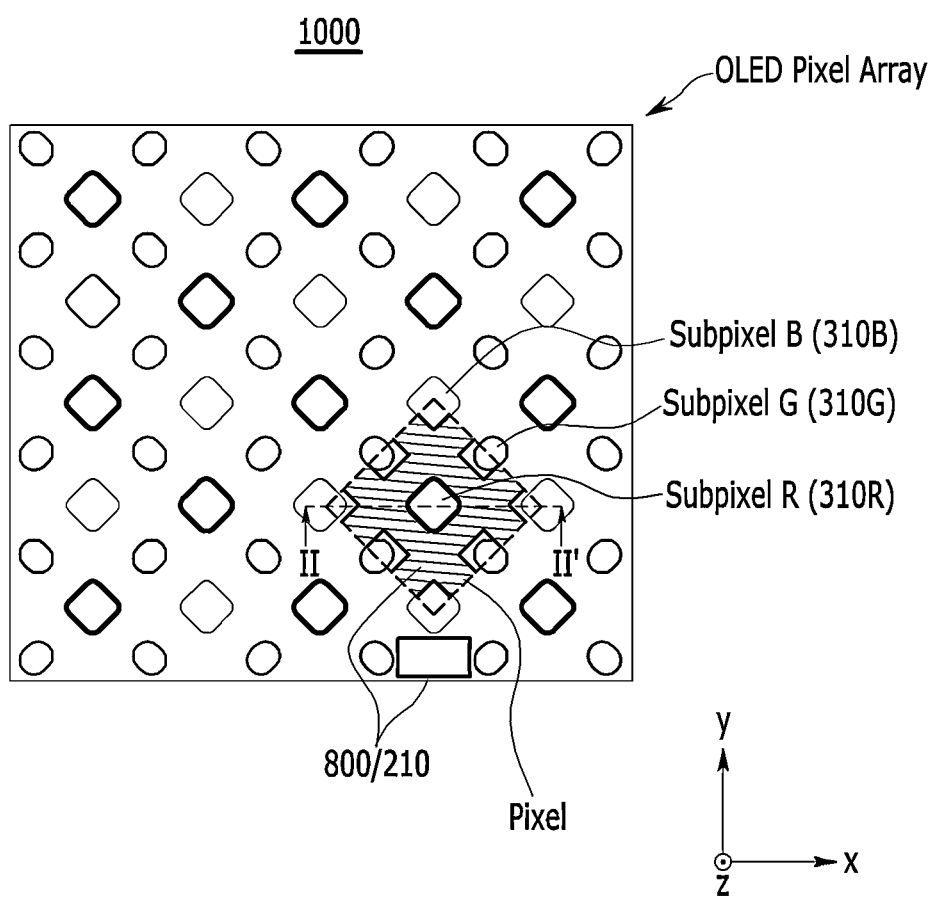
FIG. 1 is a schematic view showing a pixel layout of light emitters of a visible light sensor embedded organic light emitting diode (OLED) display panel according to some example embodiments.

Hereinafter, example embodiments of the present inventive concepts will be described in detail so that a person skilled in the art would understand the same. This disclosure may, however, be embodied in many different forms and is not construed as limited to the example embodiments set forth herein.

Regarding the reference numerals assigned to the elements in the drawings, it should be noted that the same elements will be designated by the same reference numerals, wherever possible, even though they are shown in different drawings Hereinafter, visible light sensor embedded organic light emitting diode (OLED) display panels according to some example embodiments is described with reference to the drawings.

Figure 2:
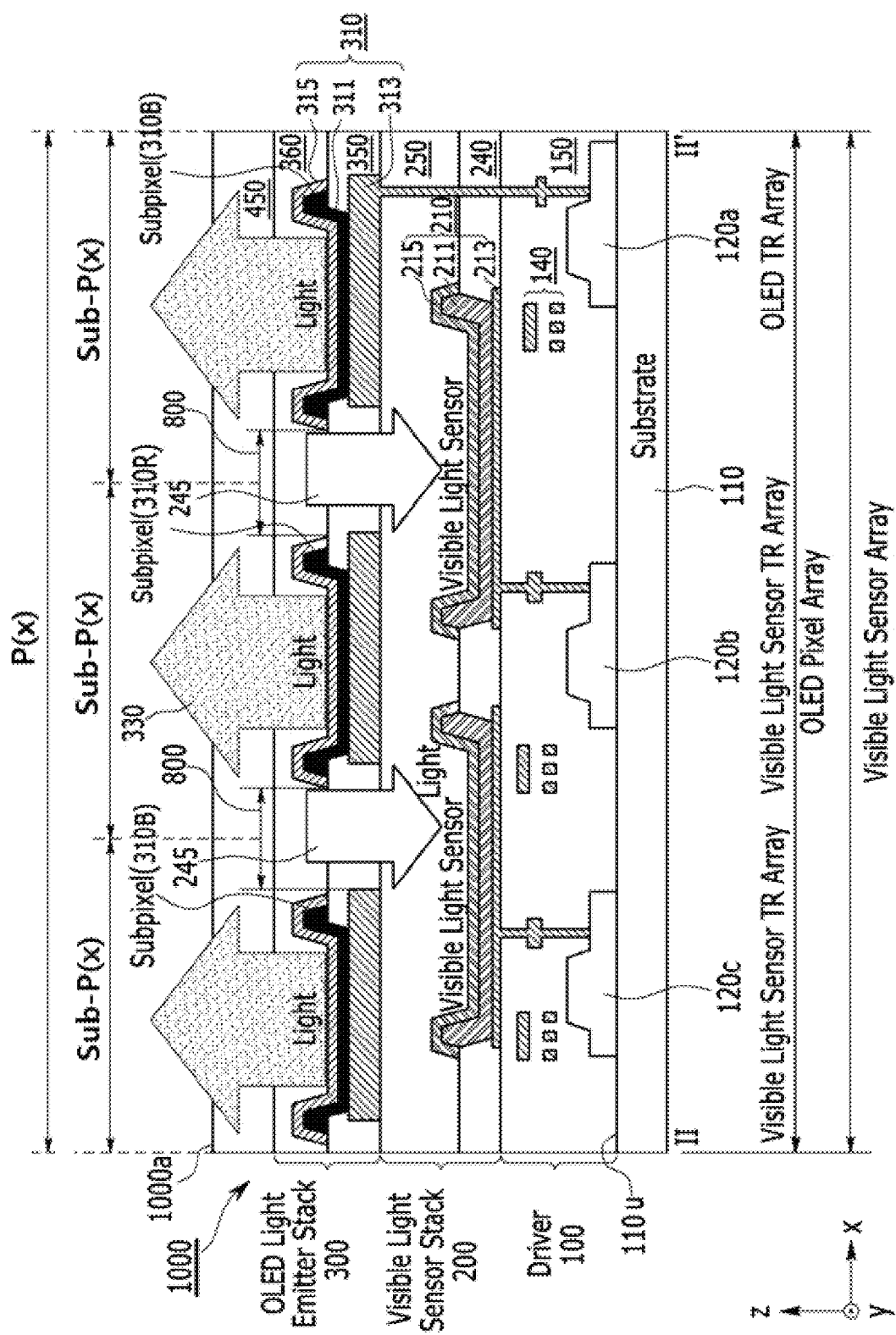
FIG. 2 is a cross-sectional view showing a visible light sensor embedded OLED display panel according to some example embodiments.

FIGS. 1 and 2 show a pixel layout of visible light sensors embedded OLED display panel 1000 according to some example embodiments and a cross-sectional view thereof, respectively. The cross-sectional view shown in FIG. 2 may be a cross-sectional view of the OLED display panel 1000 shown in FIG. 1 along view line II-II'.

Referring to FIGS. 1 and 2, a visible light sensor embedded OLED display panel 1000 according to some example embodiments is a stack-type display panel that includes a visible light sensor stack 200 that is stacked under an OLED light emitter stack 300. Accordingly, as shown in FIGS. 1 and 2, and as further shown in at least FIGS. 4 and 7-8, an OLED display panel 1000 may include a substrate 110, an OLED light emitter stack 300 on the substrate 110, and at least one visible light sensor 210 on the substrate 110. The OLED light emitter stack 300 may include one or more OLEDs 310 configured to emit light 330. Each OLED 310 may be referred to herein as simply an OLED light emitter that is configured to emit light 330. The visible light sensor 210 may be configured to detect at least a portion of the emitted light 330 (e.g., light 245) based on reflection of the portion of the emitted light 330 from a recognition target.

In the OLED light emitter stack 300, sub-pixels 310R, 310G, and 310B are grouped to provide a unit pixel (Px), where a unit pixel (Px) as described herein may be referred to as simply a pixel (Px), and the unit pixel (Px) is repeated and arranged in a pattern, also referred to herein as a matrix. The sub-pixels 310R, 310G, and 310B may include and/or may be defined by separate OLEDS 310 that may be configured to emit light of different wavelength spectra, such that the sub-pixels 310R, 310G, and 310B may be understood to be configured to emit light of different wavelength spectra. For example, sub-pixel 310R may be defined by an OLED 310 that is configured to emit light 330 in a red wavelength spectrum ("red light"), sub-pixel 310G may be defined by an OLED 310 that is configured to emit light 330 in a green wavelength spectrum ("green light"), and sub-pixel 310B may be defined by an OLED 310 that is configured to emit light 330 in a blue wavelength spectrum ("blue light").

FIG. 1 shows a pentile matrix type layout in which one pixel (Px) comprises two green sub-pixels 310G, one red sub-pixel 310R, and one blue sub-pixel 310B (e.g., RGBG). As described herein, sub-pixel 310R may be referred to as a red OLED sub-pixel, sub-pixel 310G may be referred to as a green OLED sub-pixel, and sub-pixel 310B may be referred to as a blue OLED sub-pixel.

In the array shown in FIG. 1, the pixel array of the OLED display panel 1000 includes an array of red sub-pixels 310R, an array of blue sub-pixels 310B, and an array of green sub-pixels 310G. As shown, each array defines a separate pattern of the respective sub-pixels 310R, 310B, 310G, where some or all of the sub-pixels in a given pattern of sub-pixels may include a particular type of sub-pixel 310R, 310B, 310G. It will be understood that a given sub-pixel 310R, 310G, 310B that is defined by a pattern of respective OLEDs may not include an OLED 310 that corresponds to the sub-pixel. For example, as described further below with reference to FIGS. 7-8, a visible light sensor 210 may replace an OLED 310 in a given sub-pixel that corresponds to a pattern of OLEDS 310 (e.g., the visible light sensor 210 may be in a position at which an OLED 310 should otherwise be located based on a pattern of other OLEDs configured to emit the same wavelength spectrum of light) such that the visible light sensor 210 may be referred to as being "in" the given sub-pixel.

As further shown in FIGS. 1 and 2, the OLEDs 310 are spaced apart from each other in a horizontal direction that is parallel to the upper surface 110u of the substrate 110 (e.g., an x-direction and/or a y-direction). The regions adjacent to the OLEDs 310 in the OLED light emitter stack 300 may be referred to as non-light emitting regions 800 of the OLED light emitter stack 300, and thus each unit pixel (Px) may include one or more OLEDs 310 and a non-light emitting region 800 adjacent to the one or more OLEDs 310. As shown, the non-light-emitting region of a unit pixel (Px) may be a continuous region that surrounds the OLEDs 310 of the pixels (Px) of the OLED display panel 1000 in the pixel array of the OLED display panel 1000. As shown, the non-light emitting region(s) of the OLED display panel 1000 may include insulating layers 350 and 360, which may be at least partially transparent to light 330 that may be emitted by the OLEDs 310 and reflected back into and through the OLED light emitter stack 300 from a recognition target. Accordingly, reflected light 245 may pass through the OLED light emitter stack 300 via the non-light emitting region(s) of the unit pixels (Px) of the OLED display panel 1000.

It will be understood that, because the unit pixels (Px) of the OLED display panel 1000 may have the same horizontal boundaries (e.g., in the x and y directions) as the corresponding unit pixels (Px) of the OLED light emitter stack 300, where the unit pixels (Px) of the OLED light emitter stack 300 are defined by a particular grouping of the sub-pixels 310R, 310G, 310B of the OLED light emitter stack 300, the unit pixels (Px) of the OLED display panel 1000 and the corresponding unit pixels (Px) of the OLED light emitter stack 300 may be collectively referred to herein as simply unit pixels (Px) or simply pixels (Px).

It will be understood that, in some example embodiments, some or all of the pixels (Px) and/or sub-pixels in the OLED display panel 1000 and/or OLED light emitter stack 300 may be arranged according to one or more other patterns, or matrices, including a strip structure pattern.

It will be understood that the OLED display panel 1000 may be described as including an array of pixels (Px), where each pixel (Px) of the OLED display panel 1000 may be considered to correspond to a separate pixel (Px) of the OLED light emitter stack 300. Additionally, each pixel (Px) of the OLED display panel 1000 may include one or more sub-pixels (Sub-Px), where each sub-pixel (Sub-Px) of a pixel (Px) of the OLED display panel 1000 may be considered to correspond to a separate sub-pixel 310R, 310G, 310B of the OLED light emitter stack 300. For example, as shown in FIG. 2, a given pixel (Px) of the OLED light emitter stack 300 includes a certain set of sub-pixels 310R, 310G, and 310B that are configured to emit light having different wavelength spectra (e.g., one red sub-pixel 310R, one blue sub-pixel 310b, and two green sub-pixels 310G may define a pixel (Px) of the OLED light emitter stack 300), and a given pixel (Px) of the OLED display panel 1000 encompasses (and is defined by) the given pixel (Px) of the OLED light emitter stack 300, such that the given pixel (Px) of the OLED display panel includes (and is defined by) the given pixel of the OLED light emitter stack 300 and the portions of the visible light sensor stack 200, driver 100, substrate 110, and cover glass 450 that overlap the pixel (Px) of the OLED light emitter stack 300. Similarly, as shown in FIG. 2, each separate sub-pixel (Sub-Px) of the given pixel (Px) of the OLED display panel 1000 includes (and is defined by) a separate sub-pixel 310R, 310B, 310G of the pixel (Px) of the OLED light emitter stack 300 and further includes the portions of the visible light sensor stack 200, driver 100, substrate 110, and cover glass 450 that overlap the respective sub-pixel of the OLED light emitter stack 300.

As further shown, the boundaries of the sub-pixels (Sub-Px) and pixels (Px) of the OLED display panel 1000, while defined by the respective sub-pixels 310R, 310G, 310B and pixels (Px) of the OLED light emitter stack 300, may not exactly be the same as the boundaries of the respective sub-pixels 310R, 310G, 310B and pixels (Px) of the OLED light emitter stack 300. For example, as shown in FIG. 2, each sub-pixel of the OLED display panel 1000 includes a respective sub-pixel of the OLED light emitter stack 300 and also includes a portion (e.g., half) of the non-light emitting region 800 extending between the respective sub-pixel of the OLED light emitter stack 300 and one or more adjacent sub-pixels of the OLED light emitter stack 300. OLED display panel 1000 includes a given pixel (Px) of the OLED light emitting stack.

Herein, where OLED sub-pixels are referenced, it will be understood that said OLED sub-pixels are referring to sub-pixels of the OLED light emitter stack 300 (e.g., 310R, 310G, 310B), instead of sub-pixels of the OLED display panel 1000.

In FIGS. 1 and 2, a visible light sensor 210 is disposed under the non-light emitting region 800 to implement the detection of the visible light 245 received at the visible light sensor 210 through the non-light emitting region 800 between respective OLED sub-pixels (Sub-Px). FIG. 2 shows one example that the sub-pixels 310R, 310G, and 310B and the visible light sensor 210 are partially overlapped in the vertical direction (z-direction). Accordingly, as shown in FIGS. 1-2, a visible light sensor 210 may be between a non-light emitting region 800 of the OLED light emitter stack 300 and the substrate 110 so as to be vertically aligned with the non-light emitting region 800 of the OLED light emitter stack 300 in a vertical direction (e.g., z-direction) extending perpendicular to the upper surface 110u of the substrate 110.

It will be understood that, as described herein, an element that is "above" or "below" another element may be referred to as being "on" the other element. Similarly, an element that is described herein to be "on" another element may be "above" or "below" the other element. Furthermore, an element that is described to be "between" two other elements may be separately "on" each of the two other elements. It will be understood that an element that is "on" another element may be "directly" on the other element so as to be in direct contact with the other element or may be "indirectly" on the other element so as to be isolated from direct contact with the other element by one or more interposing spaces and/or structures.

It will be understood that an element and/or direction that is described herein as being parallel with a reference surface may be substantially parallel with the reference surface such that the element and/or direction is parallel with the reference surface within manufacturing tolerances and/or material tolerances. It will be understood that an element and/or direction that is described herein as being perpendicular with a reference surface may be substantially perpendicular with the reference surface such that the element and/or direction is perpendicular with the reference surface within manufacturing tolerances and/or material tolerances.

The OLED display panel 1000 shown in FIGS. 1 and 2 may be suitable for a high resolution display panel having a display resolution of greater than or equal to about 2960× 1440 (WQHD) and an aperture ratio between sub-pixels (Sub-Px) of about 4%. But the present disclosure is not necessarily limited to the resolution and the aperture ratio.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

The OLED light emitter stack 300 is a region configured to emit light, and therefore is configured to emit light to display an image and also to emit light for biometric recognition, simultaneously or separately. The OLED light emitter stack 300 includes OLEDs 310 (also referred to herein as OLED light emitters), each OLED 310 including an organic emission layer 311, and a first electrode 313 and a second electrode 315 formed under and on the organic emission layer 311. As shown, the OLED light emitter stack 300 includes insulation layers 350 and 360, where portions of the OLEDs 310 may be formed on insulation layer 350, in gaps in the insulation layer 350, and/or between separate instances of insulation layer 350, and insulation layer 360 may be formed on both insulation layer 350 and the OLEDs 310 to cover the OLEDs 310.

The organic emission layer 311 may be formed of (may at least partially comprise) various organic materials inherently configured to emit light 330 of any one of red R, green G, and blue B colors (wavelength spectra) away from an upper surface 110u of the substrate 110, that is, in an opposite direction from the visible light sensor stack 200. Accordingly, and as shown in FIG. 1, each separate OLED 310 in a unit pixel (Px) of the OLED light emitter stack 300 (and thus a unit pixel (Px) of the OLED display panel 1000) may be considered to be, and thus may define, a separate subpixel 310R, 310B, 310G of the OLED light emitter stack 300 (OLED sub-pixel).

Either one of the first electrode 313 and the second electrode 315 is connected to a driving voltage line (Vdd) and an output terminal (Out Put) to function as an anode, and the other is connected to a common voltage (Vss) to function as a cathode. In order to well express light emitted from the organic emission layer 311, the second electrode 315 may be formed as a light-transmitting electrode with a thickness of less than or equal to about 100 nm. For example, the second electrode 315 may be formed of MgAg, Ag, Mg, Al, Mo, Ti, TiN, Ni, ITO, IZO, AIZO, AITO, or the like. The first electrode 313 may be formed with a reflecting electrode.

As described above, luminous efficiency of the OLED 310 may be improved based on the first electrode 313 being a reflecting electrode. For example, the first electrode 313 may be formed of Al, Ag. Mo, AlNd, Mo/Al/Mo, TiN, ITO/Ag/ITO, ITO/Al/ITO, ITO/Mo/ITO, or the like. It may be formed with a light transmitting electrode to fluently enter light toward the lower visible light sensor stack 200. The light-transmitting electrode may have a transmittance of greater than or equal to about 80%. For example, the first electrode 313 may be formed of ITO, IZO, AIZO, AITO, or the like.

The visible light sensor stack 200 may include a visible light sensor 210 that is an organic photodiode including a visible light absorption layer 211, a lower first electrode 213 and an upper second electrode 215. Particularly, the visible light absorption layer 211 may be formed with (may at least partially comprise) an organic material which may absorb visible light through the whole region of visible light (e.g., may absorb visible light at any wavelength within the entire wavelength spectrum of visible light, for example between about 380 nm to about 740 nm). For example, it may include any material suitable for absorbing visible light, for example, squaraine based, D-π-A based, Bodipy based, phthalocyanine based materials, and the like. For example, the visible light absorption layer 211 may include any well-known OLED material configured to emit visible light of any wavelength spectrum, including, for example, any one of phosphorescent materials, fluorescent materials, and TADF. Well-known materials that may at least partially comprise one or more visible light absorption layers 211 of the one or more visible light sensors 210 may include metal complexes such as Ir complex, Pt complex, Os complex, and Pd complex, anthracene (blue), Alq3 (green), DCM (red), any combination thereof, or the like. It will be understood that, in some example embodiments, a visible light sensor 210 may be other than an organic photodiode, for example the visible light sensor 210 may be a silicon photodiode, a quantum dot photodiode, or the like.

As shown, the visible light sensor stack 200 includes insulation layers 240 and 250, where portions of the visible light sensors 210 may be formed on insulation layer 240, in gaps in the insulation layer 240, and/or between separate instances of insulation layer 240, and insulation layer 250 may be formed on both insulation layer 240 and the visible light sensors 210 to cover the visible light sensors 210.

As shown in FIG. 2, a given unit pixel (Px) may include multiple visible light sensors that are vertically aligned with separate non-light emitting regions 800 of the OLED light emitter stack 300 or separate portions of a same non-light emitting region of the OLED light emitter stack 300.

Referring to FIG. 1, in some example embodiments a visible light sensor stack 200 may include an individual visible light sensor 210 that extends continuously in vertical alignment with ("vertically overlapping") a continuous non-light emitting region 800 that extends continuously between adjacent OLEDs 310 of the OLED light emitter stack 300 of the unit pixel (Px). As shown in FIG. 1, where the OLEDs 310 are arranged in a pentile matrix in the OLED display panel 1000, the non-light emitting region 800 of the unit pixel (Px) may have a hatch shape (#), and the visible light sensor stack 200 may include an individual visible light sensor 210 that has a hatch shape (#) so as to be vertically aligned with (e.g., overlap in the Z-direction) the hatch-shaped non-light emitting region 800.

Separate unit pixels (Px) may include separate visible light sensors 210, such that visible light sensors 210 of adjacent unit pixels (Px) are isolated from direct contact with each other in a horizontal direction. As shown, a hatch-shaped visible light sensor 210 may include gaps that vertically overlap with at least a portion of one or more OLEDs 310. Referring to FIG. 2, which shows two separate visible light sensors 210 under a given unit pixel (Px) of the OLED light emitter stack 300, in some example embodiments, a unit pixel (Px) of the OLED display panel 1000 may include an individual visible light sensor 210 instead of multiple visible light sensors 210 under the unit pixel (Px) of the OLED light emitter stack 300. At least a portion of one or more visible light sensors 210 may extend horizontally, beyond vertically overlapping with one or more non-light emitting regions 800, such that the one or more visible light sensors 210 at least partially vertically overlap with (e.g., overlap in the Z-direction with) one or more OLEDs 310 of the OLED light emitter stack 300.

In some example embodiments, a visible light sensor 210 in a given unit pixel (Px) (e.g., under a given unit pixel (Px) of the OLED light emitter stack 300 and within a corresponding given unit pixel (Px) of the OLED display panel 1000) may have a shape with no internal horizontal gap spaces such that the visible light sensor 210 may extend continuously under, and thus vertically overlap with, both some or all of the one or more OLEDs 310 and the one or more non-light emitting regions 800 of the OLED light emitter stack 300. For example, while the cross-sectional view of FIG. 2 provides the appearance of a unit pixel (Px) that includes two separate visible light sensors 210, or an individual visible light sensor 210 that includes a gap space under the sub-pixel 310R and extending continuously out of plane of the cross-sectional view (e.g., in the Y-direction), in some example embodiments, the cross-sectional view of the unit pixel (Px) of FIG. 2 may show an individual visible light sensor 210 that extends continuously under at least the sub-pixel 310R and under at least a portion of the non-light emitting regions 800 at opposite sides of the sub-pixel 310R.

While a greater quantity of visible light sensors 210 in a unit pixel (Px) and/or a visible light sensor 210 that has reduced or no vertical overlap with the one or more OLEDs 310 of the unit pixel (Px) may provide improved resolution of images generated by the visible light sensors 210 of the OLED display panel 1000, larger visible light sensors 210 that extend continuously under some or all of the OLEDs in a unit pixel (Px), in addition to the non-light emitting region(s) in the unit pixel (Px), may be fabricated more easily and with reduced cost due to reduced complexity of the shape of the visible light sensor 210.

While FIGS. 1-2 may illustrate that each unit pixel (Px) of the OLED display panel 1000 may include one or more visible light sensors 210, and may in some example embodiments include multiple visible light sensors 210 such that the quantity of visible light sensors 210 in an OLED display panel 1000 is greater than the quantity of unit pixels (Px) of the OLED display panel 1000 (and thus greater than the quantity of corresponding unit pixels (Px) of the OLED light emitter stack 300), it will be understood that, in some example embodiments, an OLED display panel 1000 may include a visible light sensor stack 200 that includes one or more visible light sensors 210 that extend between multiple (e.g., adjacent) unit pixels (Px) (e.g., under multiple unit pixels of the OLED light emitter stack 300) such that one or more visible light sensors may be "shared" by multiple (e.g., two or more) unit pixels (Px). In some example embodiments, the ratio of the quantity of unit pixels (Px) (which may be either of the unit pixels of the OLED display panel 1000 or the corresponding unit pixels of the OLED light emitter stack 300) to visible light sensors 210 in an OLED display panel may be between about 2:1 to about 1:0.1. In some example embodiments, the pixel density (e.g., density of unit pixels (Px)) in an OLED display panel 1000 may be about 550 pixels per inch (ppi) and the sensor density (e.g., density of visible light sensors 210) in the OLED display panel 1000 may be about 200 dots per inch (dpi).

Referring back to FIG. 1, in some example embodiments an OLED display panel 1000 may include one or more visible light sensors 210 that are not arranged in a pattern or position that is based on the patterns of OLEDs/sub-pixels of the OLED light emitter stack 300 but is instead are located at one or more particular positions in the OLED display panel 1000, for example at an edge of the OLED display panel 1000 as shown in FIG. 1. Such visible light sensors 210 may be repeatedly arranged in or under one or more non-light emitting regions 800 in the OLED display panel 1000.

At least one of the first electrode 213 and the second electrode 215 is connected to a driving voltage line (Vdd) and an output terminal (Out Put) and functions as an anode, and the other is connected to a common voltage (Vss) and functions as a cathode. As the first electrode (lower electrode, 213) is formed with the reflecting electrode, it may further improve sensing efficiency of the visible light sensor 210. For example, the first electrode (lower electrode, 213) may be formed of Al, Ag. Mo, AlNd, Mo/Al/Mo, TiN, ITO/Ag/ITO, ITO/Al/ITO, ITO/Mo/ITO, and the like. The second electrode (upper electrode, 215) may be formed with the transparent electrode, so that incident light may be absorbed into the visible light absorption layer 211 as much as possible. For example, the second electrode (upper electrode, 215) may be formed of ITO, IZO, AIZO, Ag nanowire, graphene, CNT, and the like.

The driver 100, also referred to herein as simply a "driver stack," may be disposed between the substrate 110 and the visible light sensor stack 200 not to deteriorate light-emitting function and light-receiving function of the OLED light emitter stack 300 and the visible light sensor stack 200.

The driver 100 is formed on the substrate 110 and includes various transistor arrays 120a, 120b, and 120c (see FIG. 11A) configured to input (receive) and output (transmit) electrical signals from/to the visible light sensor stack 200 and the OLED light emitter stack 300 which are on the upper part and an interlayer insulating layer 150 in which a multi-layered wire layer 140 is formed.

The OLED transistor array 120a and a visible light sensor transistor array 120b may be formed on the same plane. While FIG. 2 only illustrates an OLED transistor array 120a and wire extending between the OLED transistor array 120a and a single OLED 310 of the OLEDs 310 of sub-pixels 310R, 310B, and 310G in the cross-sectional view of FIG. 2, it will be understood that the driver 100 includes additional transistor arrays 120a that are each separately connected to a separate one of the OLEDs 310 of sub-pixels 310R and 310G, and said additional transistor arrays 120a are positioned out of plane of the cross-sectional view of FIG. 2 (e.g., in the Y-direction). When the transistor arrays 120a, 120b, 120c are formed on the same plane, each process of forming the OLED transistor array 120a and a visible light sensor transistor array 120b may be simultaneously carried out so it is not needed to prepare an additional process mask, compared to the case of forming them on different planes, so the number of process steps may be reduced. In addition, the thickness of the display panel may be thinner than the case of forming the transistor arrays in different planes, so it may be more suitable for embodying a flexible display panel.

The substrate 110 may be formed with various materials such as glass or plastic. In a case of plastic, it may be formed with a transparent and flexible material.

A cover glass 450 attached by an adhesive (not shown) is disposed on the OLED light emitter stack 300 and may protect the lower structure to provide a display surface and a biometric recognition surface.

Figure 10:
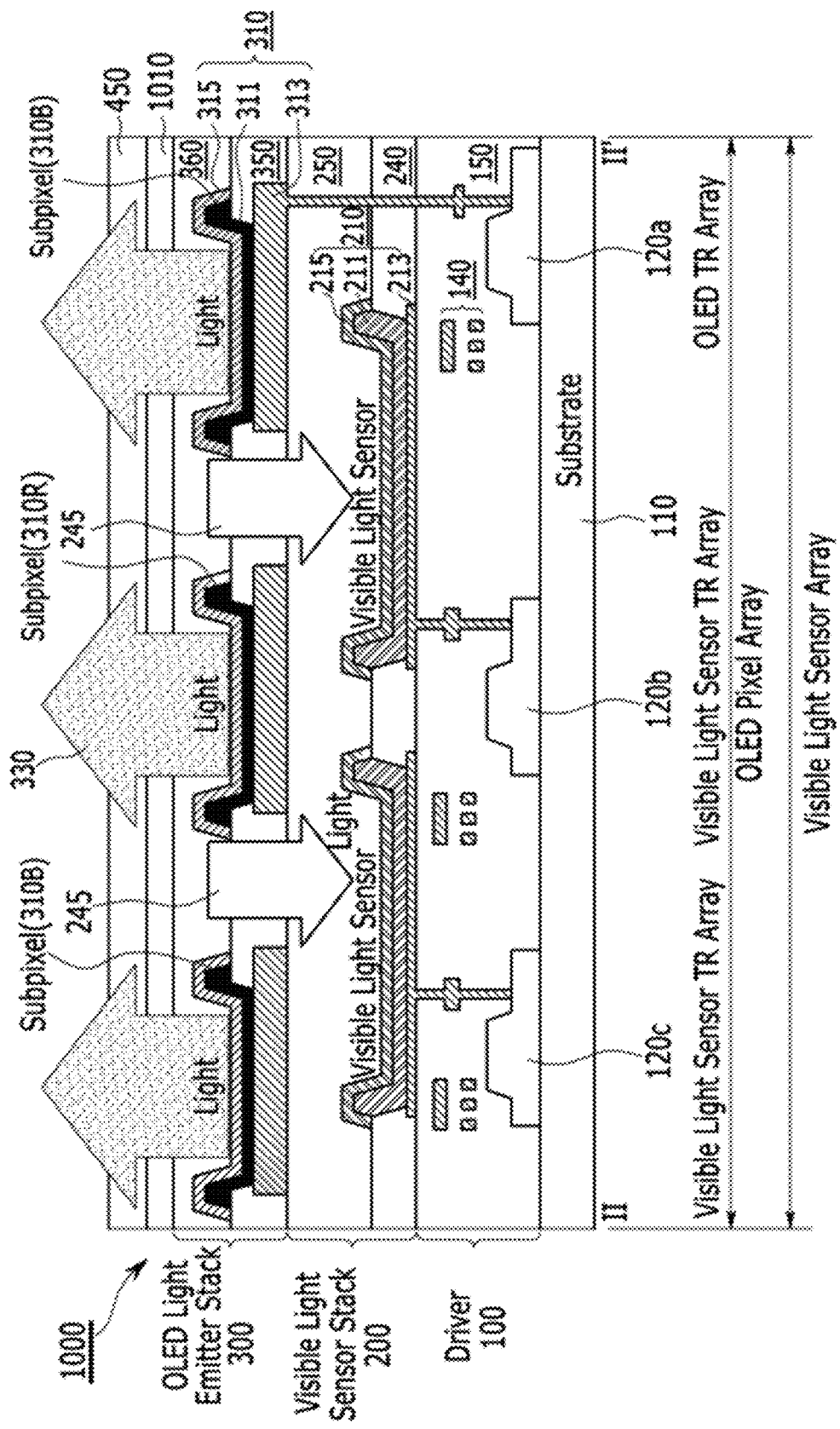
FIG. 10 is a cross-sectional view showing a visible light sensor embedded OLED display panel that includes a touch sensor according to some example embodiments.

While not shown in FIG. 2, it will be understood, for example as shown in FIG. 10, that the OLED display panel 1000 may include a touch sensor 1010.

Figure 8:
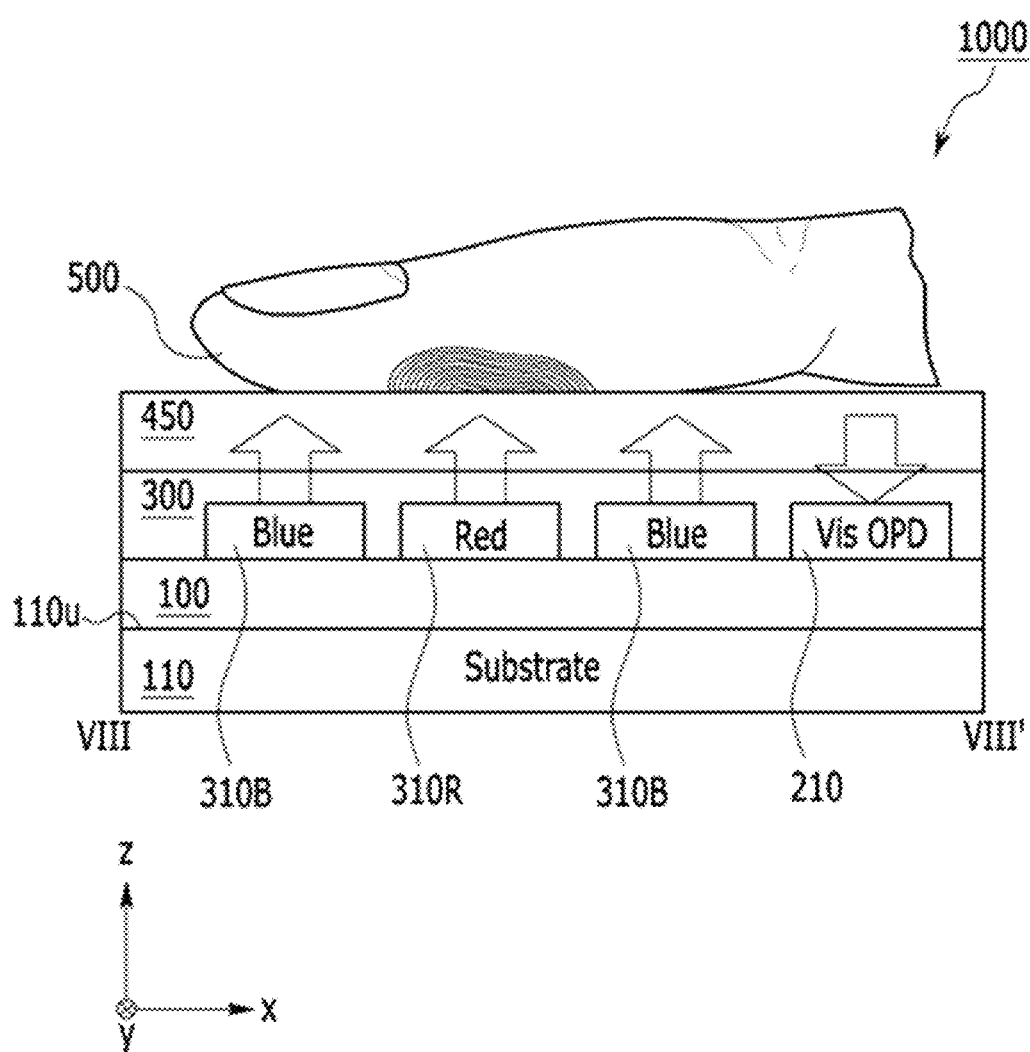
FIG. 8 is a cross-sectional view of a visible light sensor embedded OLED display panel according to some example embodiments.

In some example embodiments, the OLED display panel 1000 may have reduced thickness, and thus reduced device volume, improved flexibility, or any combination thereof due to the visible light sensors 210 being included "in-cell" as shown in FIG. 2 (and further as shown in FIG. 8 as described below). As a result, the amount of light transmission by the OLEDs 310 of the OLED light emitter stack 300 may be improved, which may improve sensitivity of the visible light sensors 210 when the OLEDs 310 are used to emit light and the visible light sensors 210 are used to detect reflections of the emitted light from a recognition target to perform biometric recognition operations. Accordingly, the OLED display panel 1000 may be configured to enable improved biometric recognition accuracy. In addition, because the visible light sensors 210 are included "in-cell" with the OLEDs 310 as shown in FIG. 2 (and further as shown in FIG. 8 as described below), fabrication of the OLED display panel 1000 may be simplified (e.g., by omitting bonding of separate stacks that include a separate element of the visible light sensors 210 and the OLEDs 310 and include separate, respective substrates on which separate elements are formed prior to the bonding). Additionally, power consumption in a display device that includes the OLED display panel 1000 may be improved based on reducing or omitting separate light sources for biometric recognition operations beyond the OLEDs 310 that are already included in the OLED display panel 1000 and can be used as light sources for the visible light sensors 210 during a biometric recognition operation.

Figure 3:
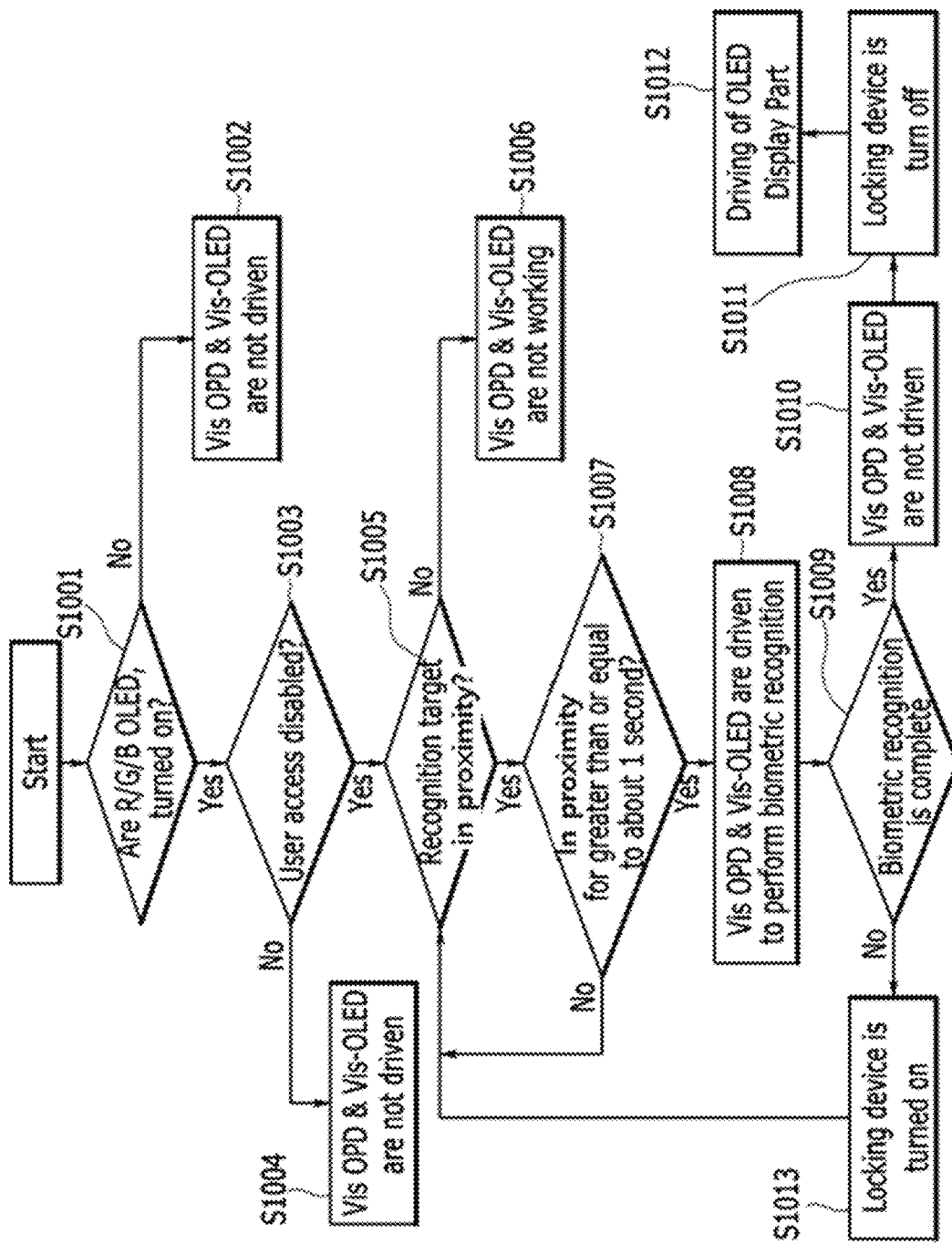
FIG. 3 is a flowchart for illustrating a motion algorithm of a visible light sensor embedded display panel.
Figure 4:
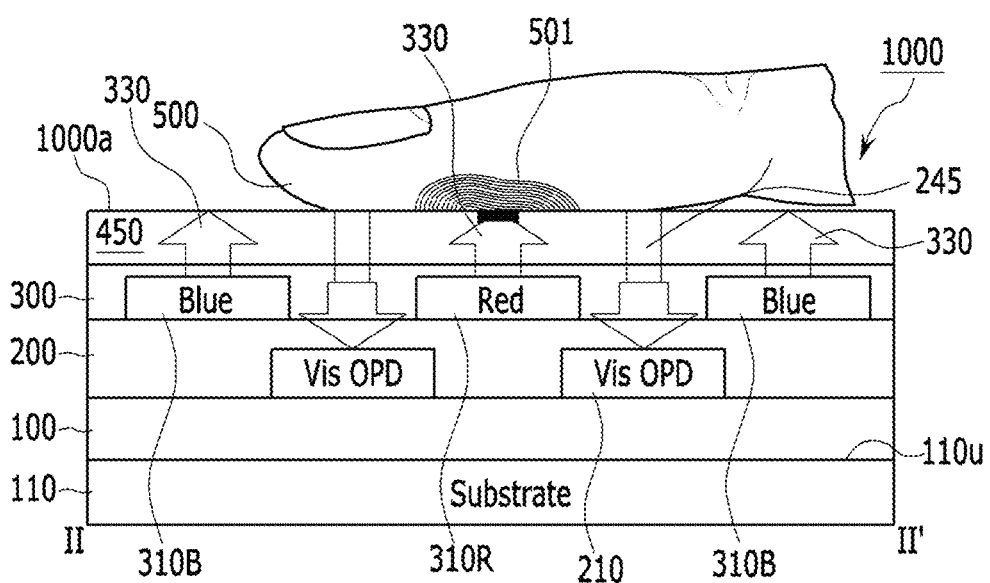
FIG. 4 is a schematic view illustrating an operation of biometric recognition, specifically, fingerprint recognition by using a visible light sensor embedded organic light emitting diode display panel according to some example embodiments.
Figure 5:
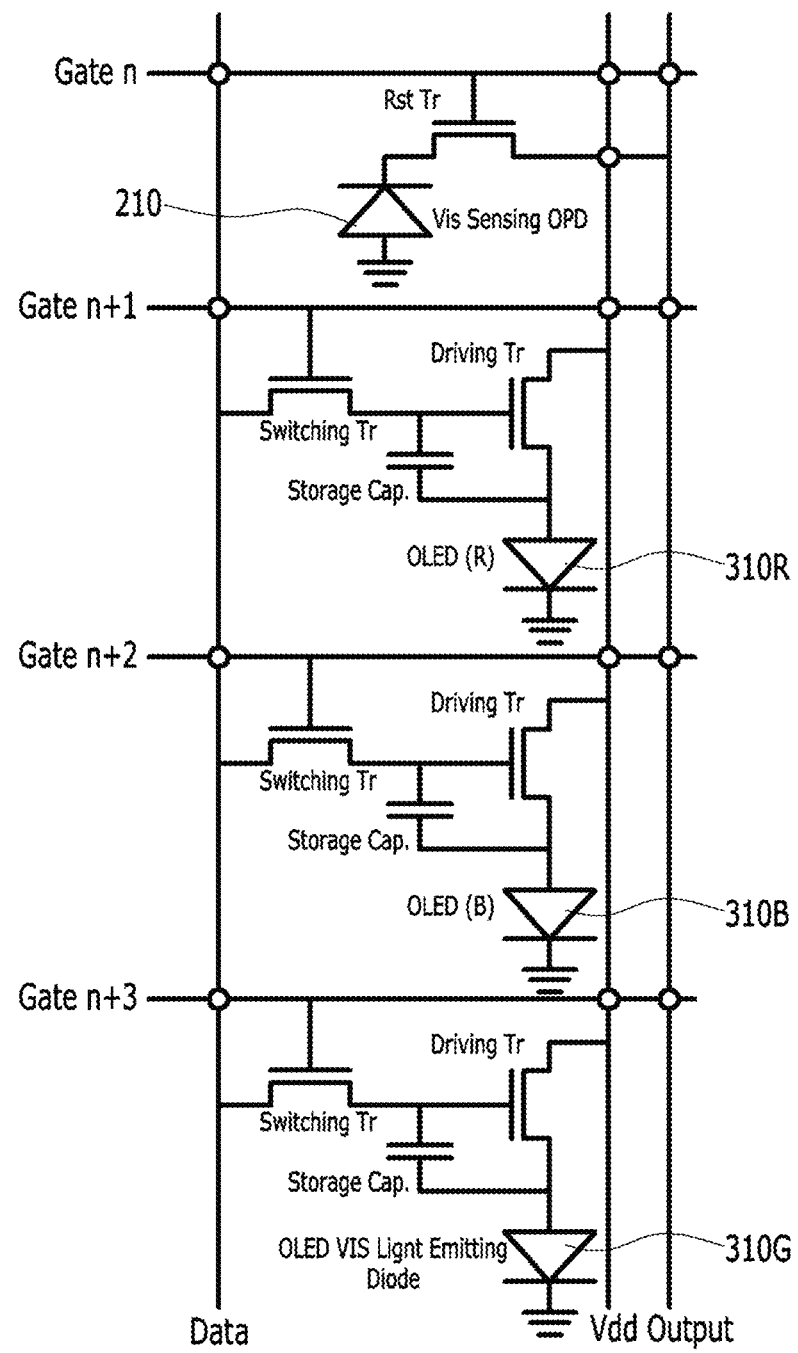
FIG. 5 shows a read out circuit of an OLED sub-pixel and a visible light sensor.
Figure 6:
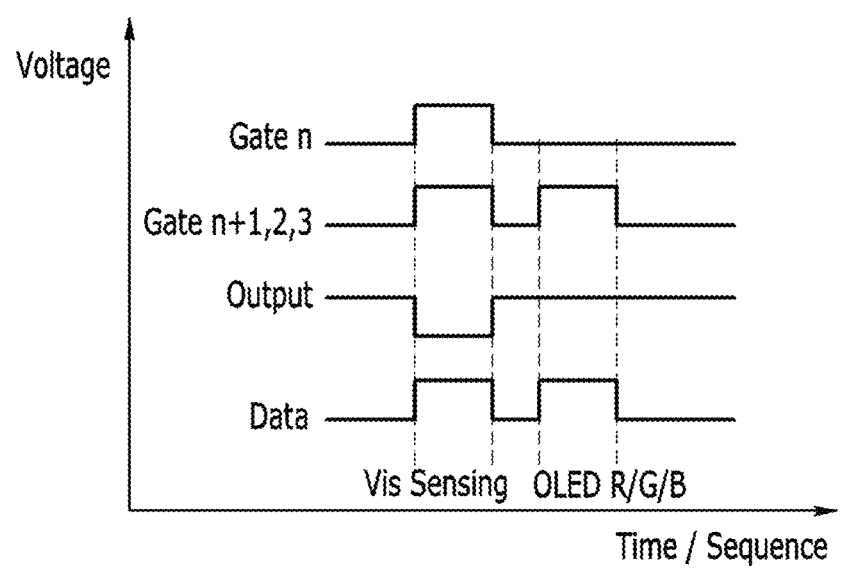
FIG. 6 is a timing diagram for a fingerprint recognition operation and a display signal.

FIG. 3 is a flowchart illustrating an operation algorithm of a display panel 1000 embedded with the visible light sensor 210; FIG. 4 is a schematic view showing operations of biometric recognition, specifically, fingerprint recognition by using of the visible light sensor embedded organic light emitting diode (OLED) display panel according to some example embodiments; FIG. 5 shows a read out circuit of each sub-pixel 310R, 310G, and 310B and a visible light sensor 210; and FIG. 6 is a timing diagram for expressing a fingerprint recognition operation and a display signal. FIG. 3 exemplifies an organic visible light sensor (Vis OPD) as a visible light sensor. It will be understood that the operation algorithm shown in FIG. 3 may be partially or entirely implemented by processing circuitry as described herein with reference to FIG. 13 and may be implemented with regard to any of the example embodiments of the OLED display panel 1000, including example embodiments illustrated in FIGS. 7-8. The cross-sectional view shown in FIG. 4 may be a cross-sectional view of the OLED display panel 1000 shown in FIG. 1 along view line II-II'.

As shown in FIGS. 3-6, a method for performing biometric recognition with regard to a portion of a user of a display device, such portion being referred to as a recognition target (e.g., face, hand, iris, fingerprint, etc.) where the display device includes any of the example embodiments of OLED display panels 1000, may include driving an OLED 310 to emit light 330 and further driving a visible light sensor 210 to detect at least a portion 245 of the emitted light 330 based on reflection of the portion 245 of the emitted light 330 from a recognition target, in response to a determination that the OLED 310 is turned on, user access to the display device is disabled, and a recognition target that is a portion of the user is in a certain proximity to the OLED display panel; and turning off the visible light sensor 210, granting user access to the display device, and driving the OLED 310 to cause the OLED display panel 1000 to display an image, in response to a determination that recognition of the recognition target is completed via comparison of a reference recognition target image with an image of the recognition target generated based on an output signal of the visible light sensor 210 in response to detecting the reflected portion 245 of the emitted light 330.

First, it is determined whether R/G/B OLEDs (e.g., the OLEDs 310 of sub-pixels 310R, 310G, and 310B) are turned on (S1001). The turning on of the R/G/B OLEDs 310 means a state of screen mode transition after switching a start power (e.g., initializing the supply of electrical power to the OLEDs 310 of the OLED display panel 1000). If the R/G/B OLEDs (e.g., the OLEDs 310 of sub-pixels 310R, 310G, and 310B) are turned off (e.g., power is not being supplied to the OLEDs 310), a visible light sensor 210 (Vis OPD) and R/G/B OLEDs 310 (Vis-OLEDs) are not driven (S1002). Restated, if the OLEDs 310 are turned off at S1001, then signals are not supplied to the OLEDs 310 and/or the visible light sensors 210 to drive same and/or cause same to generate output signals. In the case when R/G/B OLEDs (e.g., the OLEDs 310 of sub-pixels 310R, 310G, and 310B) are determined to be turned on (e.g., electrical power is being supplied to the OLEDs 310), it is determined whether a locking device is turned on or off (S1003).

The locking device may be a functionality that is implemented by processing circuitry as described with reference to FIG. 13 to enable ("grant") or disable ("deny") user access to the display device and/or functionality of the display device, for example by selectively enabling or disabling functionality to display images to the user via the OLED display panel 1000. Restated, a determination is made whether user access to a display device that includes the OLED display panel 1000 is enabled ("unlocked"). Such user access may be enabled based on user interaction with one or more interfaces of the display device (e.g., contact of a fingerprint with a particular portion of the OLED display panel 1000, user interaction with a button of the display device that is separate from the OLED display panel 1000, any combination thereof, or the like). In some example embodiments, user access may be enabled/disabled separately from the operational algorithm of FIG. 3, such that the display device may grant unrestricted access to any user interacting with the display device via the OLED display panel 1000; in such cases the user access functionality of the display device (e.g., the "locking device") may be considered to be turned off, such that biometric recognition of a user may not be necessary. If the locking device is determined to be turned off at S1003 (e.g., user access is enabled), the visible light sensor 210 (Vis OPD) and R/G/B OLEDs (Vis-OLEDs, e.g., the OLEDs 310 of sub-pixels 310R, 310G, and 310B), which are one of the locking devices, are not driven (S1004), similarly to at S1002. In the case when the locking device is turned on (e.g., user access to the display device via the OLED display panel 1000 is presently disabled), it is determined whether a recognition target is in a certain proximity to the OLED display panel 1000

(S1005). As described below with reference to FIG. 10, an OLED display panel 1000 may include one or more touch sensors 1010 that may generate output signals based on contact between a recognition target that is a portion of the user (e.g., a fingerprint) with at least a portion of the OLED display panel 1000. A touch sensor of the OLED display panel 1000 may be considered to be turned on when the touch sensor generates an output signal that indicates that a recognition target is in contact with at least a portion of the OLED display panel 1000. A recognition target may be determined to be within a certain proximity of the OLED display panel 1000 (S1005=yes) if an output signal is received from the touch sensor in response to the recognition target being in contact with the OLED display panel.

If the recognition target is not in the certain proximity to the OLED display panel (e.g., no signal is received from the touch sensor), the visible light sensor 210 (Vis OPD) and R/G/B OLEDs (Vis-OLEDs, e.g., the OLEDs 310 of sub-pixels 310R, 310G, and 310B) are not driven (S1006), similarly to S1002 and S1004. In some example embodiments, where the biometric recognition operation of FIG. 3 involves performing biometric recognition of a recognition target that is not in contact with the OLED display panel (e.g., face recognition, iris recognition, or the like), the determination at S1005 may include driving one or more visible light sensors 210 (e.g., a particular limited selection of the visible light sensors 210 of the OLED display panel 1000) to generate output signals that may be processed to generate an image of a field of view of the OLED display panel 1000 to determine whether a recognition target (e.g., user iris, user face, or the like) is within the field of view and thus is in proximity to the OLED display panel. Thereby, power consumption more than required for biometric recognition operations may be reduced or prevented by inhibiting the use of power to drive the OLEDs 310 and visible light sensors 210 except in response to a determination that the OLEDs 310 are turned on (and thus the OLED light emitter stack 300 is turned on), user access to the display device is disabled, and a recognition target is in a proximity to the OLED display panel (e.g., in contact with the OLED display panel 1000 and/or within the field of view of the OLED display panel 1000). In the case when the touch sensor is turned on and the locking device is turned on, it is determined whether a finger 500 is contacted on the surface of the display panel 1000 for a threshold period of time or longer (e.g., greater than or equal to about 1 second) as shown in FIG. 4 (S1007), or whether a recognition target within the field of view of the OLED display panel 1000 is within the field of view for at least a threshold period of time (e.g., greater than or equal to about 1 second).

One or more visible light sensor 210 (Vis OPD) and R/G/B OLEDs (Vis-OLEDs, e.g., the OLEDs 310 of sub-pixels 310R, 310G, and 310B) are selectively operated (driven) in the case when the recognition target is determined to be in the proximity to the OLED display panel for at least the threshold period of time or longer (S1008). In other words, as shown in FIGS. 5 and 6, driving the OLEDs 310 may include turning on the gate lines (Gate n+1, Gate n+2, Gate n+3) connected to red OLED sub-pixel 310R, blue OLED sub-pixel 310B, green OLED sub-pixel 310G which causes red OLED sub-pixel 310R, blue OLED sub-pixel 310B, green OLED sub-pixel 310G to emit light 330, so that visible detecting light 330 may be reflected or scattered on a surface of a recognition target (e.g., the finger 500 surface, also referred to as a fingerprint 501, as shown in FIG. 4).

It will be understood that, in some example embodiments, operation S1008 includes driving a particular limited set of the visible light sensors 210 and OLEDs 310 of the OLED display panel 1000. For example, where the recognition target is a fingerprint in contact with a particular limited area of the total area of a surface 1000a of the OLED display panel 1000, as indicated by one or more touch sensors of the OLED display panel 1000, operation S1008 may include selectively driving only a limited portion of visible light sensors 210 that are in a limited portion of an array of visible light sensors 210 and OLEDs 310 that are in a limited portion of an array of OLEDs 310 that vertically overlap with the limited area.

As shown in FIGS. 5 and 6, when the reflected or scattered light is received (detected, absorbed, or the like) by a visible light sensor 210 (Vis sensing OPD), the gate line (Gate n) connected to the visible light sensor 210 (Vis sensing OPD) turns on (e.g., the visible light sensor 210 is driven), and a output line turns on, the signal accumulated in the visible light sensor 210 (Vis sensing OPD) is output through the output line (Output) as an output signal. The output signals generated by an array of visible light sensors 210 in some or all of the OLED display panel 1000 may be processed to generate an image of the recognition target (e.g., a fingerprint image of the finger 500) through an image generation process, which may include any well-known process for image generation based on output signals generated by an array of visible light sensors 210, thereby performing fingerprint recognition. A light emitter (e.g., OLEDs 310) emits each of red, green and blue light 330, but the visible light sensor 210 (Vis sensing OPD) may be configured to absorb light in an entire visible light wavelength spectrum (e.g., may absorb visible light at any wavelength within the entire wavelength spectrum of visible light), such that the output signal does not specifically indicate the specific wavelength of the incident light 245 within the visible wavelength spectrum. Accordingly, output signals by an array of visible light sensors 210 in the OLED display panel 1000 may be processed to generate a monochromatic image. Even if carrying out Fourier transform at a low frequency, an OLED display panel 1000 that includes visible light sensors 210 that are each configured to absorb the same wavelength spectrum of light, and that extends over some or all of the entire visible wavelength spectrum, may provide merits of producing clearer digital image process results than the case of absorbing each of red, green, and blue. Restated, an OLED display panel 1000 that includes unit pixels (Px) with one or more (or sharing one or more) visible light sensors 210 that are each configured to absorb the same wavelength spectrum of light 245, where the wavelength spectrum extends over some or all of the entire visible wavelength spectrum, may be configured to generate a monochromatic image (based on output signals generated by the visible light sensors 210 in response to incident light 245) that has greater resolution than a color image generated based on output signals generated by an array of RGB light sensors having similar size, sensor quantity, and pattern properties. This may be because a visible light sensor 210 that absorbs light across the entire visible wavelength spectrum may have more photocurrent than a visible light sensor 210 that only absorbs one of red, blue, or green light during rising time and fall time for generation of each frame (e.g., image).

It will be understood that the gate lines shown in FIGS. 5 and 6 may be turned on based on certain visible light sensors 210 and OLEDs 310 being driven according to signals generated and/or transmitted by one or more instances of processing circuitry as described herein to supply power to the respective gate lines. As shown in FIGS. 5 and 6, such signals may be supplied to the gate lines via the "data" line; such signals may be referred to herein as "data" signals.

Subsequently, it is determined whether the biometric recognition is complete (S1009), and when the fingerprint recognition is completed, the driving of the visible light sensor 210 (Vis OPD) and R/G/B OLEDs (Vis-OLEDs, e.g., the OLEDs 310 of sub-pixels 310R, 310G, and 310B) that are driven starting at S1008 is ended (S1010), and the locking device is also turned off (i.e., user access to the display device is granted) (S1011). It will be understood that biometric recognition may include comparing the generated image of the recognition target with one or more stored reference images of recognition targets that are associated with authorized users for which access to the display device is pre-granted, and where recognition may be determined to be completed if the image generated based on processing output signals from the one or more visible light sensors 210 matches a stored reference recognition target image within at least a threshold confidence level (e.g., at least 90% confidence match). Where the recognition target is a fingerprint, the reference recognition target images may be stored fingerprint images of fingerprints of authorized users. Similarly, where the recognition target is a face or iris, the reference images may be stored face images or iris images, respectively.

In some example embodiments, an OLED display panel 1000 may include one or more infrared light emitters 310IR and one or more infrared light sensors 210IR, and where the recognition target is not in contact with the OLED display panel 1000 (e.g., an iris or face), the driving at S1008 may include selectively driving at least one or more infrared light emitters 310IR and at least one or more infrared light sensors 210IR to cause an image of the recognition target to be generated based at least in part on reflected infrared light being received by the one or more infrared light sensors 210IR.

Then gate lines (Gate n+1, Gate n+2, Gate n+3) connected to red OLED sub-pixel 310R, blue OLED sub-pixel 310B, green OLED sub-pixel 310G are turned on and a general display is performed through the driving of a display signal part that turns on red OLED sub-pixel 310R, blue OLED sub-pixel 310B, green OLED sub-pixel 310G (S1012). Restated, at S1012, the OLED light emitter stack 300 is driven to emit light to display one or more images. Unless and until the biometric recognition is completed at S1009, the locking device is turned on again or maintained on (S1013) and Step (S1005) is operated again.

Although FIG. 3 exemplifies a fingerprint of a finger 500 as a biometric subject, it may be applied for various biometric subjects ("recognition targets") such as a palm print, an iris, a retina, and a face.

The visible light sensor embedded OLED display panel illustrated referring to FIGS. 1 to 6 employs the OLEDs 310 as a light source as it is with no additional light source for the biometric recognition, so that it may prevent an aperture ratio decrease of the OLED(s) 310 In the array of OLEDs 310 in the OLED display panel 1000. Accordingly, the utilization of the OLEDs 310 as a light source for the visible light sensors 210 during a biometric recognition operation enables the OLED display panel 1000 to be configured to enable performance of the biometric recognition operation without any reduction in the quantity, spacing, or emission power of the OLEDs, thereby preventing a reduction in the cumulative light transmission area of the OLED display panel (e.g., the "aperture ratio" of the OLED display panel 1000).

In addition, as the visible light sensor 210 is formed in a stack structure under the non-light emitting region which does not have an effect on the aperture ratio of the OLED(s) 310, it may maintain the aperture ratio of the OLED light emitter(s) 310 as it is. In addition, the biometric recognition sensor is used as a visible light sensor to maximize the incident light dose, so that it may improve accuracy and efficiency of biometric recognition.

The visible light sensor 210 is formed of an organic material and thus may be bent or stretchable. Accordingly, the visible light sensor 210 may contribute to easily realizing a flexible display device and thus improve portability and versatility of a display device.

Figure 7:
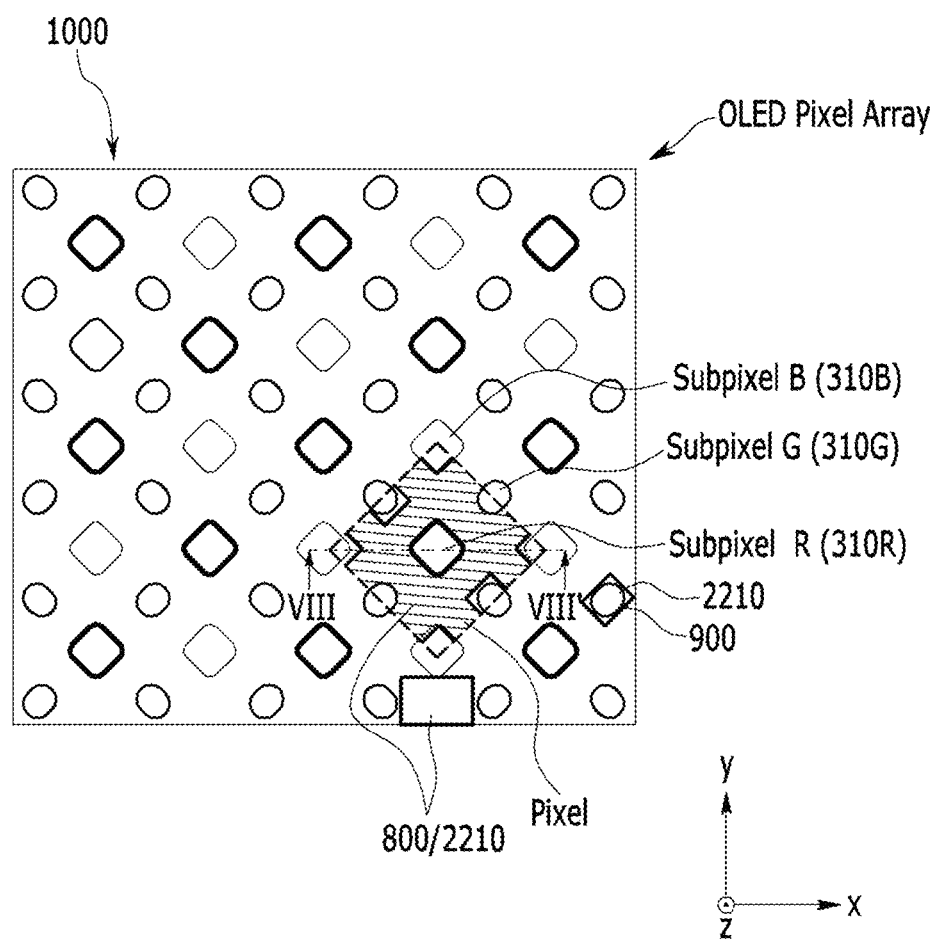
FIG. 7 is a schematic view showing a pixel layout of a light emitter of a visible light sensor embedded organic light emitting diode display panel according to some example embodiments.

FIG. 7 is a schematic view showing a pixel layout of a light emitter of a visible light sensor embedded organic light emitting diode (OLED) display panel according to some example embodiments, and FIG. 8 is a cross-sectional view of a visible light sensor embedded OLED display panel according to some example embodiments. The cross-sectional view shown in FIG. 8 may be a cross-sectional view of the OLED display panel 1000 shown in FIG. 7 along view line VIII-VIII'.

A visible light sensor embedded OLED display panel 1000 according to some example embodiments illustrated in FIGS. 7 and 8 includes an OLED light emitter stack 300 and a visible light sensor 2210 disposed on the same plane as the OLED light emitter stack 300, such that the visible light sensor 2210 is in the non-light emitting region 800 of the OLED light emitter stack 300 (e.g., the non-light emitting region 800 that is adjacent to one or more OLEDs 310 of the OLED light emitter stack 300) and is aligned with at least one adjacent OLED 310 (e.g., at least one OLED 310 of the OLED sub-pixels 310R, 310G, or 310B) of the OLED light emitter stack 300 in a horizontal direction extending in parallel to an upper surface 110u of the substrate 110 (e.g., an x-direction). It will be understood that the visible light sensor 2210 shown in FIG. 8, horizontally aligned with at least one adjacent OLED light emitter (e.g., sub-pixel 310B) may be understood to be included in the OLED light emitter stack 300 along with the sub-pixels 310R, 310G, and 310B. As shown in FIG. 7, the visible light sensor 2210 in the non-light emitting region 800 of the OLED light emitter stack 300 may have a shape and size so as to extend continuously along and around one or more OLEDS 310 of a unit pixel (Px) and/or between two or more adjacent OLEDs 310 of a unit pixel (Px), or may simply occupy a portion of the non-light emitting region 800 that is bounded by proximate OLEDs 310.

The OLED display panel 1000 is a structure in which the OLED light emitter stack 300 and the driver 100 are stacked. In the OLED light emitter stack 300, one unit pixel (Px) is formed with sub-pixels 310R, 310G, and 310B emitting lights R, G, B having different wavelengths from each other, and the unit pixels (Px) are repeated and arranged in a matrix. Thus, the visible light sensor 2210 may be formed in a non-light emitting region 800 between each OLED sub-pixels or a part of green OLED region 900.

For example, where a OLED display panel 1000 includes a pattern of red OLED sub-pixels 310R, a pattern of green OLED sub-pixels 310G, and a pattern of blue OLED sub-pixels 310B, one or more of the green OLEDs 310 in the pattern of green sub-pixels 310G may be replaced ("substituted") with one or more visible light sensors 2210, such that the one or more visible light sensors 2210 occupy a location in the OLED light emitter stack 300 that corresponds to a location of a green OLED sub-pixel 310G in the pattern of green OLED sub-pixels 310G in the OLED display panel

1000. The visible light sensor 2210 that replaces a green OLED 310 in the OLED display panel may be referred to as being "in" a green sub-pixel 310G of the OLED display panel 1000/OLED light emitter stack 300. It will be understood that one or more visible light sensors 2210 may, in addition or in alternative to being "in" a green sub-pixel 310G, be "in" a red sub-pixel 310R and/or a blue sub-pixel 310B.

The OLED display panel 1000 illustrated in FIGS. 7 and 8 is a display panel having a display resolution of less than or equal to about 2220×1080 (FHD), which is appropriate in the case of an aperture ratio between sub-pixels (Sub-Px) of less than or equal to about 40%. But the present disclosure is not necessarily limited to the resolution and the aperture ratio.

The OLED light emitter stack 300 is a region for displaying an image and also a region for emitting light for biometric recognition, simultaneously. The visible light sensor 2210 may include an organic photodiode as in the OLED 310 for the OLED light emitter stack 300. In this case, the upper electrode of the OLED 310 and the upper electrode of the visible light sensor 2210 may be formed with a transflective electrode, and the lower electrode of the OLED 310 and the lower electrode of the visible light sensor 2210 may be formed with a reflective electrode. For example, the upper electrode of the OLED 310 and the upper electrode of the visible light sensor 2210 may be formed of MgAg, Ag, Mg, Al, and the like. The lower electrode of the OLED 310 and the lower electrode of the visible light sensor 2210 may be formed of Al, Ag, Mo, AlNd, Mo/Al/Mo, TiN, ITO/Ag/ITO, ITO/Al/ITO, ITO/Mo/ITO, and the like.

In addition, the visible light absorption layer for the visible light sensor 2210 may be formed of an organic material configured to absorb visible light through the whole region of the visible light, as in some example embodiments. For example, it may include any materials suitable for absorbing visible light such as squaraine based, D-Tr-A based, Bodipy based, phthalocyanine based materials, and the like.

The fingerprint recognition of the OLED display panel 1000 illustrated in FIGS. 7 and 8 is performed according to the same process as described with references to FIGS. 3 to 6, so the descriptions thereof are omitted.

In the visible light sensors 210/2210 illustrated in FIGS. 1 to 8, an organic photodiode configured to absorb visible light is exemplified, but the visible light sensors 210/2210 may be embodied by ("may include") a-Si based P-I-N photodiode, a poly-Si based P-I-N photodiode, a CIGS (Cu, In, Ga, Se) photodiode (III-V photodiode), or a Cd—Te photodiode (II-VI photodiode).

Figure 9A:
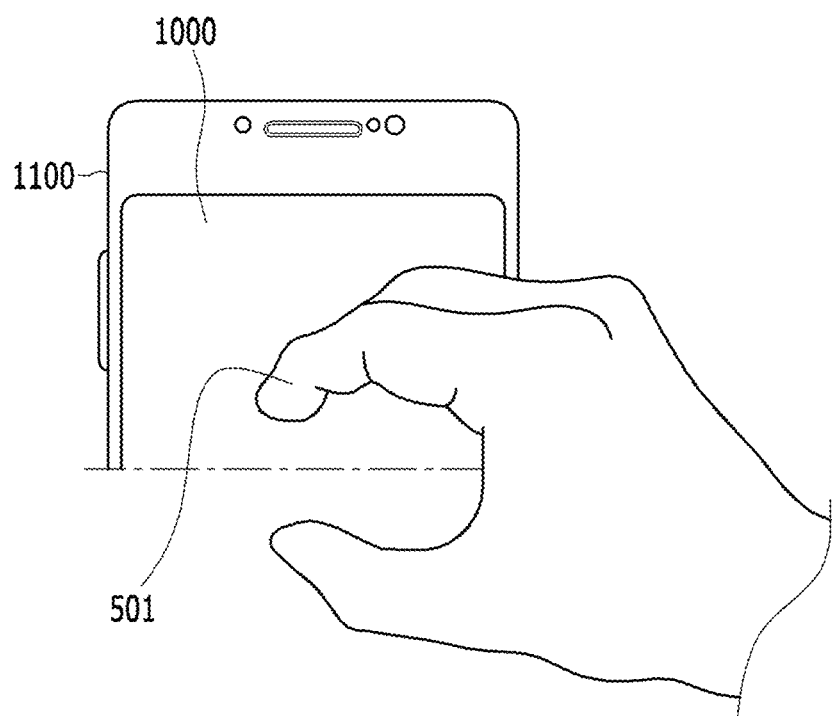
FIGS. 9A-9C are schematic views showing mobile display devices including visible light sensor embedded OLED display panels according to some example embodiments.
Figure 9B:
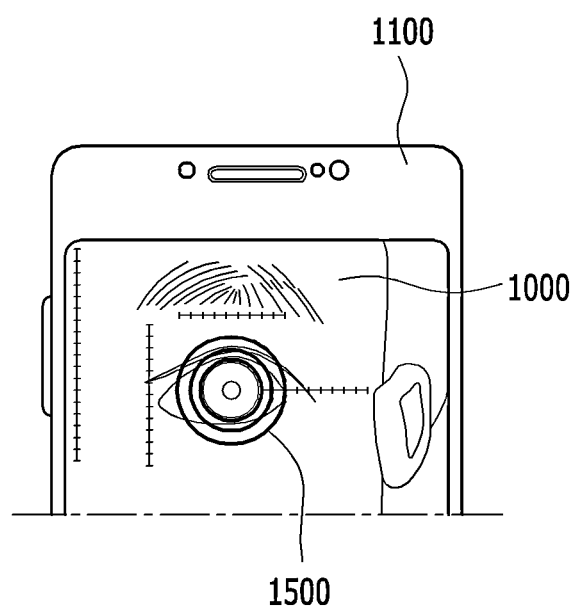
Figure 9C:
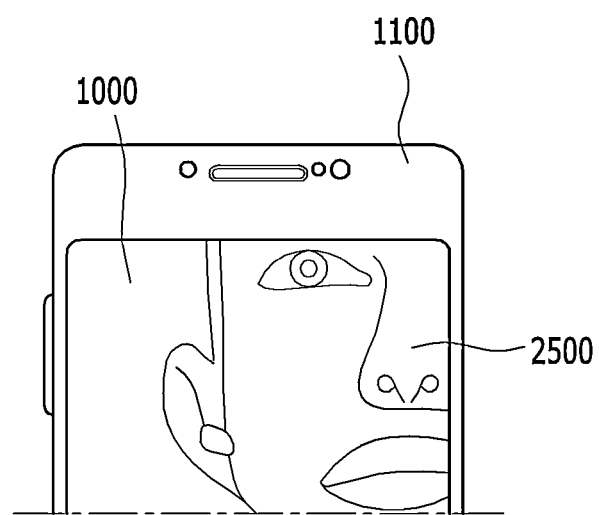

FIGS. 9A-9C are schematic views of smart phones 1100 including the visible light sensor embedded OLED display panel 1000.

FIG. 9A shows that the visible light sensor embedded OLED display panel 1000 recognizes a fingerprint 501, FIG. 9B shows the case of recognizing an iris 1500, and FIG. 9C shows the case of recognizing a face 2500. As shown in FIG. 9B, the OLED display panel 1000 may display an image of the recognition target (e.g., iris) and may further display an icon that highlights and/or overlays the image of the recognition target, for example to provide an observable indication of the recognition target for which a biometric recognition operation is being performed.

FIGS. 9A-9C show a smart phone 1100 as one example of the display device, but it may be applied to a screen such as a TV as well as for a multi-media player, a tablet PC, or the like that are capable of employing the visible light sensor embedded OLED display panel 1000, in addition to the smart phone 1100.

FIG. 10 is a cross-sectional view showing a visible light sensor embedded OLED display panel that includes a touch sensor according to some example embodiments. The cross-sectional view shown in FIG. 10 may be a cross-sectional view of the OLED display panel 1000 shown in FIG. 1 along view line II-II'.

Referring to FIG. 10, in some example embodiments, an OLED display panel 1000 may include a touch sensor 1010. As shown in the cross-sectional view of FIG. 10, the touch sensor 1010 may extend between the cover glass 450 and the OLED light emitter stack 300, but example embodiments are not limited thereto. For example, in some example embodiments, the cover glass 450 may be between the touch sensor 1010 and the OLED light emitter stack 300, the OLED light emitter stack 300 may be between the cover glass 450 and the touch sensor 1010, or the like.

A touch sensor 1010 may include one or more sensor electrodes in a mold layer and may be electrically connected, via one or more electrical wire with a device (e.g., a transistor) in the driver 100. The one or more sensor electrodes may be, for example, a transparent electrode, which may be formed of or include indium tin oxide (ITO), zinc oxide (ZnO), indium zinc oxide (IZO), cadmium tin oxide (CTO), graphene, carbon nanotube (CNT), and so forth, an opaque electrode, which may be formed of or include a metal (e.g., copper (Cu), silver (Ag), and aluminum (Al)), or any combination thereof.

In some example embodiments, the touch sensor 1010 is configured to generate one or more signals based on a recognition target (e.g., finger 500) contacting a particular pixel (Px) of the OLED display panel 1000, where separate signals may be generated for different pixels (Px) contacted by the recognition target. Accordingly, particular pixels (Px) in contact with the recognition target may be determined based on processing of said one or more signals generated by the touch sensor 1010. Such processing and determination may be implemented by processing circuitry as described further herein with reference to FIG. 13.

While FIG. 10 illustrates example embodiments of the touch sensor 1010 being included in an OLED display panel 1000 featuring a visible light sensor stack 200 between the OLED light emitter stack 300 and the substrate 110, it will be understood that the touch sensor 1010 may be included in any of the example embodiments of OLED display panels, including OLED display panels that include a visible light sensor in a non-light emitting region of the OLED light emitter stack, as described herein with reference to at least FIGS. 7-8.

It will be understood that the touch sensor 1010 shown in FIG. 10 is an example: in some example embodiments, the touch sensor 1010 may be any touch sensor known in the art.

Figure 11A:
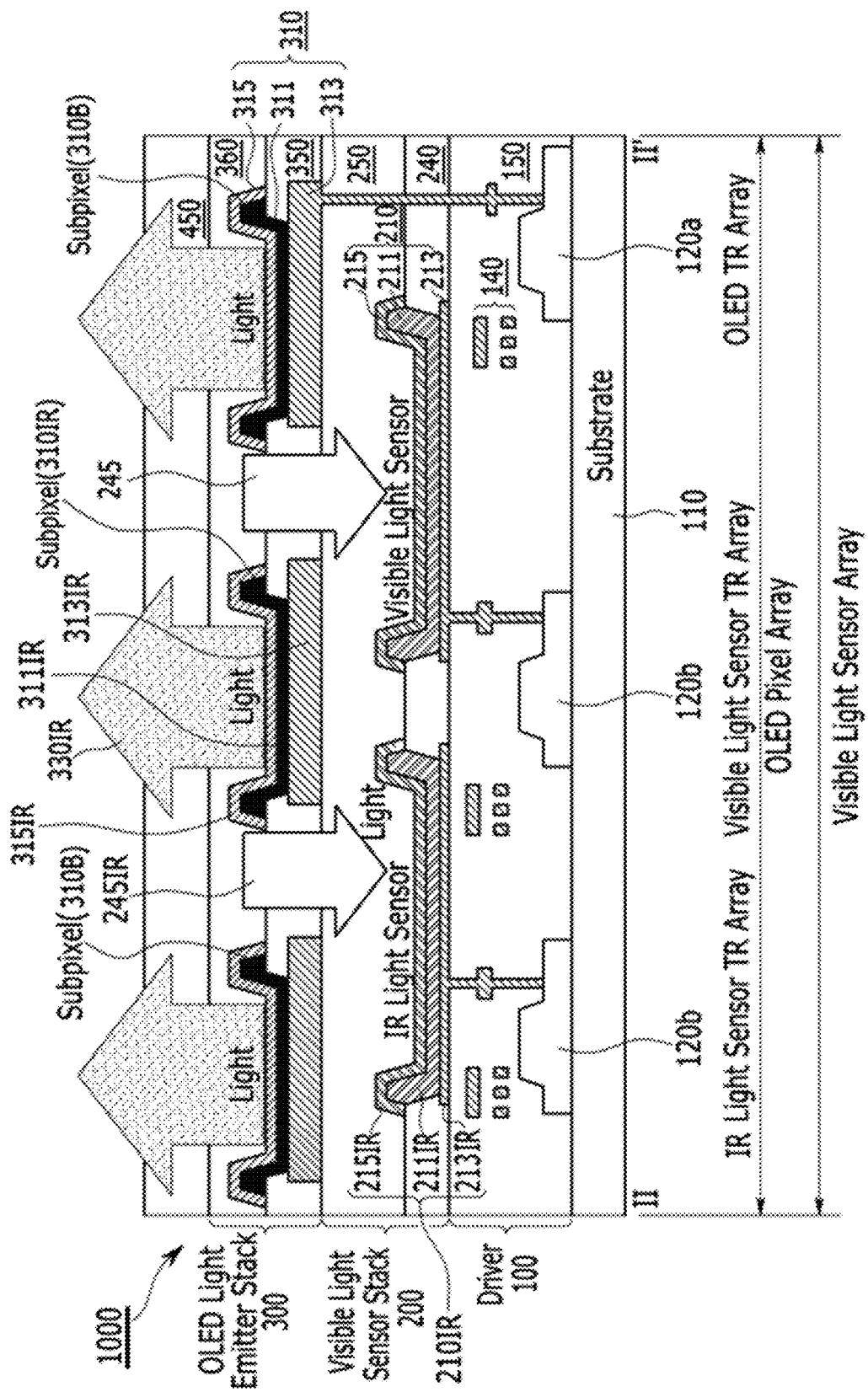
FIGS. 11A-11C are cross-sectional views showing visible light sensor embedded OLED display panels that include an infrared light emitter and an infrared light sensor according to some example embodiments.
Figure 11B:
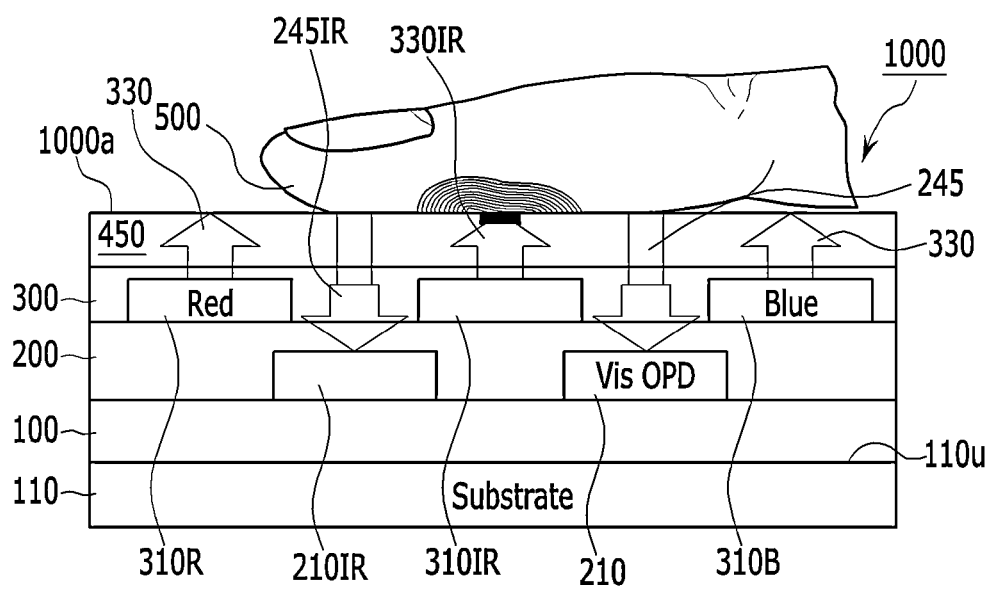
Figure 11C:
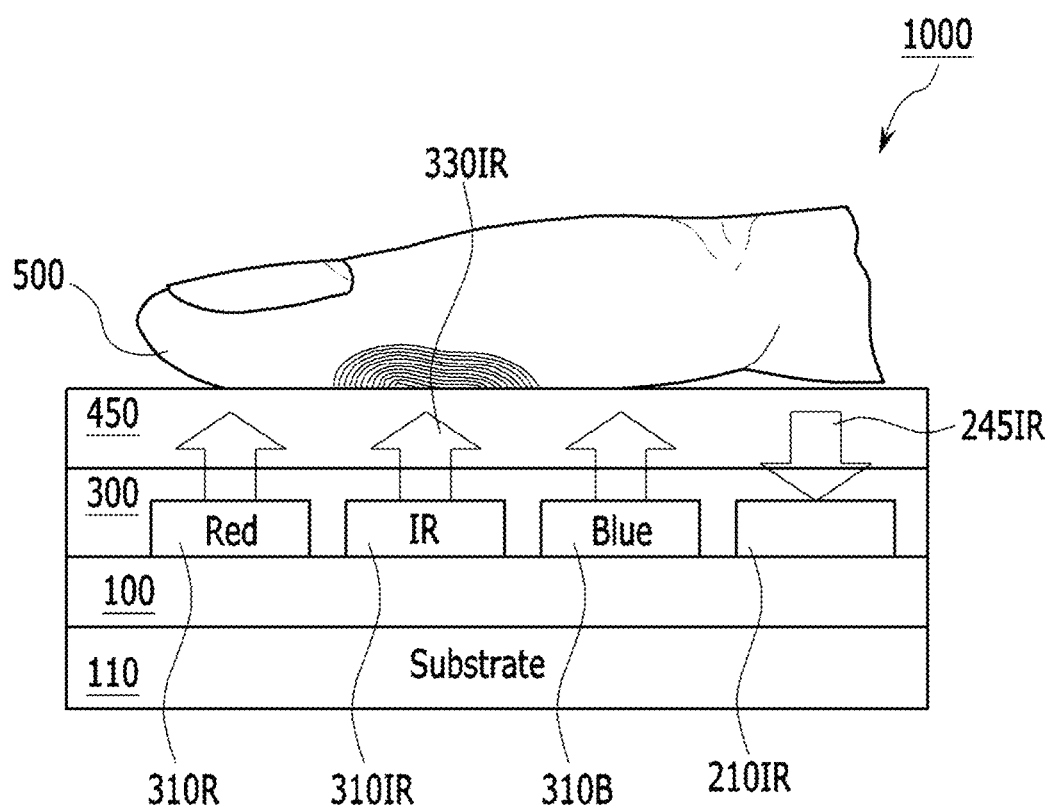

FIGS. 11A-11C are cross-sectional views showing visible light sensor embedded OLED display panels that include an infrared light emitter and an infrared light sensor according to some example embodiments.

Referring to FIGS. 11A-11C, in some example embodiments, an OLED display panel 1000 may include, in addition to an OLED 310 and a visible light sensor 210, an infrared photosensor embedded in the OLED display panel 1000, including an infrared light emitter 310IR and an infrared light sensor 210IR. It will be understood that an infrared light emitter 310IR may be a near infrared (NIR) light emitter, and an infrared light sensor 210IR may be an NIR light sensor. Accordingly, the OLED display panel 1000 may include an infrared light emitter 310IR on the substrate 110, where the infrared light emitter 310IR is configured to emit infrared light 330IR, and an infrared light sensor 210IR on the substrate, where the infrared light sensor 210IR is configured to detect at least a portion 245IR of the emitted infrared light 330IR based on reflection of the portion 245IR of the emitted infrared light 330IR from a recognition target. As shown in FIGS. 11A-11C, the infrared light emitter 310IR may be configured to emit infrared light 330IR out of the OLED display panel in a same direction as the light 330 emitted by the OLEDs 310, and the infrared light sensor 210IR may be configured to detect light 245IR received at the infrared light sensor 210IR from the same direction (e.g., light 245IR is received at the infrared light sensor 210IR through a same surface through which both the OLEDs 310 and the infrared light emitter 310IR may emit light).

As shown in FIGS. 11A-11C, the infrared light emitter 310IR and the infrared light sensor 210IR may be embedded in the OLED display panel 1000 according to the same configurations of OLEDs 310 and visible light sensors 210/2210 as described herein with reference to at least FIGS. 1-8. For example, as shown in FIGS. 11A-11C, the infrared light emitter 310IR may be included in the OLED light emitter stack 300 in one or more particular pixels (Px) of the OLED display panel 1000, and the infrared light sensor 210IR may be between one or more non-light emitting regions 800 of the OLED light emitter stack 300 and the substrate 110 (FIGS. 11A-11B) and/or in one or more non-light emitting regions of the OLED light emitter stack 300 that are adjacent to one or more OLEDs 310 of the OLED light emitter stack 300 (FIG. 11C).

It will be understood that, as shown in FIGS. 11A-11C, the infrared light emitter 310IR and/or infrared light sensor 210IR may be included in different pixels (Px) of the OLED display panel 1000 from the one or more pixels (Px) that include one or more visible light sensors 210, such that a given pixel (Px) and/or sub-pixel of the OLED display panel 1000 that includes an infrared light sensor 210IR and/or infrared light emitter 310IR does not include a visible light sensor 210. It will also be understood that, in some example embodiments, the infrared light emitter 310IR and/or infrared light sensor 210IR may be included in a same (common) pixel (Px) of the OLED display panel 1000 as one or more pixels (Px) that include one or more visible light sensors 210.

The infrared light emitter 310IR may include an organic emission layer 311IR that is configured to emit light in an infrared wavelength spectrum (e.g., one or more infrared wavelengths in a wavelength spectrum ranging from about 800 nm to about 1500 nm) and a first electrode 313IR and a second electrode 315IR formed under and over the organic emission layer 311IR, respectively (e.g., on opposite surfaces of the organic emission layer 311IR, as shown in at least FIG. 11A). The organic emission layer 311IR may be formed of ("may at least partially comprise") any material that is well-known to be appropriate for emitting light in a desired infrared wavelength. The second electrode 315IR may be formed as ("may at least partially comprise") a transparent electrode in order to be configured to enable infrared light emitted from the infrared light emitter 310IR to exit the OLED display panel 1000. For example, the second electrode 315IR may be formed of ("may at least partially comprise) ITO, IZO, AIZO, AITO, or the like. The first electrode 313IR may be formed as ("may at least partially comprise") a reflective electrode configured to enable the emitted infrared light to be emitted toward the second electrode 315IR through resonance, and the second electrode 315IR may be a transparent electrode. For example, the second electrode 315IR may be formed of ("may at least partially comprise") Al, Ag. Mo, AlNd, Mo/Al/Mo, TiN, ITO/Ag/ITO, ITO/Al/ITO, ITO/Mo/ITO, or the like.

The infrared light sensor 210IR may be an organic photodiode including an organic light-absorbing layer 211IR that is configured to absorb light in an infrared wavelength and a first electrode 213IR and a second electrode 215IR formed under and over the organic light-absorbing layer 211IR, respectively (e.g., on opposite surfaces of the organic light-absorbing layer 211IR, as shown in at least FIG. 11A). The organic light-absorbing layer 211IR may be formed of ("may at least partially comprise") any well-known material appropriate for absorbing ("configured to absorb") light of an infrared wavelength. In other words, the organic light-absorbing layer 211IR may be formed of ("may at least partially comprise") any well-known appropriate material for absorbing ("configured to absorb") light in a wavelength region ("wavelength spectrum") of about 800 to about 1500 nm. The second electrode 215IR of the infrared light sensor 210IR may at least partially comprise a transparent electrode. In some example embodiments, the second electrode 215IR may be formed of ("may at least partially comprise") a transparent electrode having transmittance of about 80% or greater (e.g., equal to or greater than about 80%). For example, the second electrode 215IR may be formed of ("may at least partially comprise") ITO, IZO, AITO, carbon nanotube (CNT), graphene, nanosilver (Nano Ag), or the like. The first electrode 213IR may be formed as ("may at least partially comprise") a reflective electrode so that the incident infrared light is not transmitted and lost. For example, the first electrode 213IR may be formed of ("may at least partially comprise") Al, Ag, Mo, AlNd, Mo/Al/Mo, TiN, ITO/Ag/ITO, ITO/Al/ITO, ITO/Mo/ITO or the like.

In some example embodiments, in a given pixel (Px) of the OLED display panel 1000 that includes at least one infrared light emitter 310IR, the infrared light sensor 210IR, which may also define an infrared sub-pixel, may be included in a same (common) pixel (Px) of the OLED display panel 1000 as red, green, and blue sub-pixels 310R, 310G, 310B. However, it will also be understood that, in some example embodiments, including the example embodiments shown in FIGS. 11A-11C, one or more pixels (Px) may include an infrared light emitter 310IR that is included in place of one of the red, green, or blue OLEDs 310 in one of the sub-pixels 310R, 310G, 310B, for example in a position that would otherwise be occupied by the one of the red, green, or blue OLEDS 310 in the one of the sub-pixels 310R, 310G, 310B in a pattern of said red, green, or blue sub-pixels 310R, 310G, 310B in the OLED display panel 1000. Such pixels (Px) that include an infrared light emitter 310IR in one of said red, green, or blue sub-pixels 310R, 310G, 310B may be a limited proportion of the total pixels (Px) of the OLED display panel 1000 pixel array, and such pixels (Px) may be included in a limited region of the OLED display panel pixel array.

Figure 12:
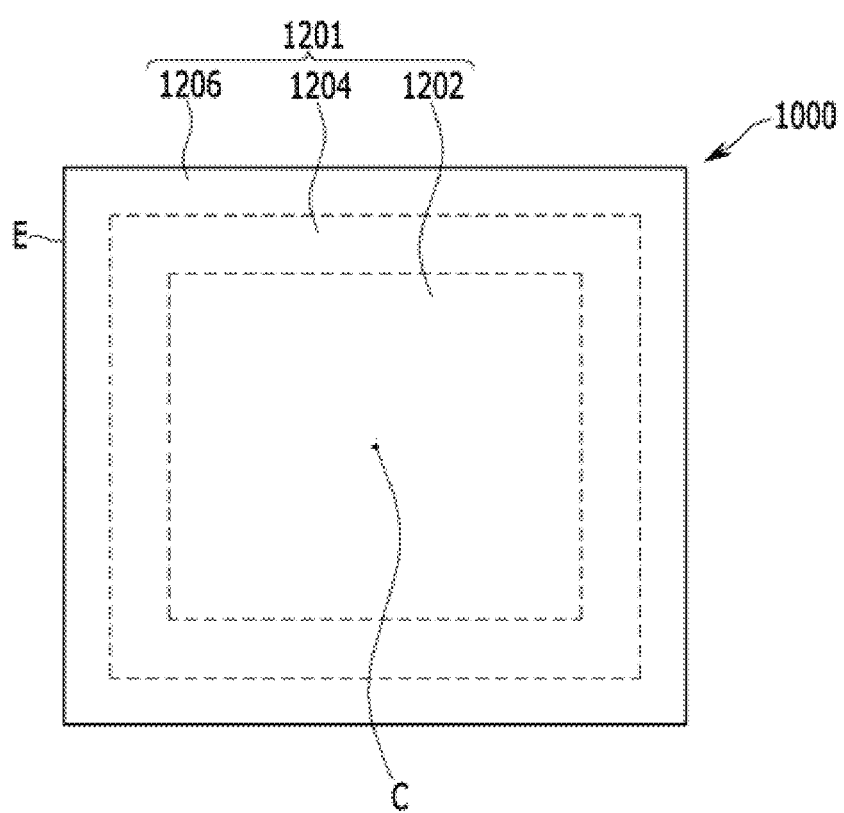
FIG. 12 is a schematic view showing various regions of a visible light sensor embedded OLED display panel having different light sensor configurations according to some example embodiments.

FIG. 12 is a schematic view showing various regions of a visible light sensor embedded OLED display panel having different light sensor configurations according to some example embodiments.

Referring to FIG. 12, the OLED display panel 1000 may include an array of unit pixels (Px) of the OLED display panel 1000, where each unit pixel (Px) includes at least one OLED light emitter. As shown, the array of unit pixels (Px) may extend through a total area TA of the OLED display panel 1000. Accordingly, the OLED display panel 1000 may include an array of OLEDs 310 on the substrate 110 and an array of light sensors 210 and/or 210IR.

Still referring to FIG. 12, the array of unit pixels (Px) of the OLED display panel 1000 may extend through multiple regions 1201-1206 of the OLED display panel 1000. Each region 1201-1206 will be understood to be a portion or entirety of the total area of the OLED display panel 1000.

As shown, in FIG. 12, the array of unit pixels (Px) may extend through a first region 1201 of the OLED display panel 1000, where the first region 1201 extends over a total area of the OLED display panel 1000. Each unit pixel (Px) that extends through the first region 1201 may include at least one OLED 310 of the OLED light emitter stack 300. Restated, the OLED light emitter stack 300 may be included in each of the pixels (Px) that extend through the first region 1201 and the array of OLEDs 310 may extend throughout the entirety of the first region 1201.

Still referring to FIG. 12, the array of unit pixels (Px) may extend through different regions 1202-1206 that are different from the first region 1201 and may be entirely encompassed within the first region 1201, such that each region 1202-1206 is smaller than the first region 1201 and regions 1202-1206 collectively define the first region 1201.

In some example embodiments, different regions 1202-1206 may include different configurations of light emitters and light sensors. For example, each unit pixel (Px) in the second region 1202 of the OLED display panel 1000, encompassed within the first region 1201, may include one or more OLEDs 310 and may further include one or more visible light sensors 210/2210, for example as shown in any of the example embodiments described above with reference to FIGS. 1-8, and furthermore each unit pixel (Px) in the second region 1202 may not include any infrared light emitters 310IR or infrared light sensors 210IR. In another example, each unit pixel (Px) in the third region 1204 of the OLED display panel 1000 may include one or more OLEDs 310, similarly to the unit pixels (Px) in the second region 1202, and may further include one or more visible light sensors 210 and/or one or more infrared light sensors 210IR. In some example embodiments, the unit pixels (Px) in the third region 1204 of the OLED display panel 1000 may include a first pattern of pixels (Px) that include one or more OLEDs 310, similarly to the unit pixels (Px) in the second region 1202, and further include one or more infrared light sensors 210IR and/or one or more infrared light emitters 310IR but no visible light sensors and a second pattern of pixels (Px) that include one or more OLEDs 310, similarly to the unit pixels (Px) in the second region 1202, and further include one or more visible light sensors but not infrared light sensors 210IR or infrared light emitters 310IR. In some example embodiments, each unit pixel (Px) in the third region 1204 of the OLED display panel 1000 may include one or more OLEDs 310, similarly to the unit pixels (Px) in the second region 1202, and may further include one or more infrared light sensors 210IR and/or one or more infrared light emitters 310IR but no visible light sensors 210. In yet another example, each unit pixel (Px) in the fourth region 1206 of the OLED display panel 1000 may include one or more OLEDs 310, similarly to the unit pixels (Px) in the second and third regions 1202 and 1204, but may not include visible or infrared light sensors 210/210IR. One or more unit pixels (Px) in the third and fourth regions 1204 and 1206 may include one or more infrared light emitters 310IR in addition to or in place of one or more OLED light emitters that are included in each pixel (Px) in the second region 1202.

Restating the above, while the array of OLEDs 310 may extend through the first region 1201, the array of visible light sensors 210 (which may consist of all of the visible light sensors of the OLED display panel 1000) may extend through the second region 1202 but may not extend through any of the third and fourth regions 1204, 1206. Accordingly, at least the third region 1204 may include at least one OLED 310 and no visible light sensors 210. In addition, an array of infrared light emitters 310IR (which may consist of all of the infrared light emitters of the OLED display panel 1000) and an array of infrared light sensors 210IR (which may consist of all of the infrared light sensors of the OLED display panel 1000) may extend through at least a portion of the first region 1201, for example may not extend through the second region 1202, may not extend through the third region 1204 and/or fourth region 1206, may only extend through the third region 1204, any combination thereof, or the like.

In some example embodiments, the light emitters and/or light sensors in different regions 1202-1206 of the OLED display panel 1000 may be driven differently during a biometric recognition operation. For example, when a biometric recognition operation is performed at least partially based on a determination that a recognition target (e.g., a fingerprint) has contacted one or more pixels (Px) in the second region 1202, OLEDs 310 and visible light sensors 210 in one or more, or all, pixels (Px) in the second region 1202 may be driven to emit light or detect incident light, respectively, and some or all of the light emitters and light sensors in the third and fourth regions 1204 and 1206 may be inactive (e.g., not driven), thereby conserving power consumption. In another example, when a biometric recognition operation is performed based on a determination that a recognition target (e.g., a face or iris) is in a proximity (e.g., field of view) of one or more light sensors of the OLED display panel 1000, the infrared light emitters and infrared light sensors 310IR and 210IR in the third region 1204 may be driven to emit light or detect incident light, respectively, and some or all of the OLED light emitters and OLED light sensors in one or more of the second, third, and fourth regions 1202, 1204, and 1206 may be inactive (e.g., not driven), thereby conserving power consumption. It will be understood that example embodiments are not limited to the above examples.

In some example embodiments, one or more of the regions 1202-1206 may have various shapes and sizes. In FIG. 12, for example, the second region 1202 includes the center C of the area of the OLED display panel, which is also the center of the area of the first region 1201, but example embodiments are not limited thereto. Additionally, as shown in FIG. 12, the second region 1202 does not extend to any of the edges E of the OLED display panel 1000, but example embodiments are not limited thereto: in some example embodiments, the second region 1202 may extend to one or more of the edges E of the OLED display panel 1000 and/or may not extend through the center C of the OLED display panel 1000. In some example embodiments, including the example embodiments shown in FIG. 12, the third region 1204 may extend between at least one side of the second region 1202 and at least one edge of the OLED display panel 1000. In some example embodiments, including the example embodiments shown in FIG. 12, the third region 1204 may completely surround the second region 1202 and may be between all sides of the second region 1202 and all edges E of the OLED display panel 1000, but example embodiments are not limited thereto.

As shown in FIG. 12, the third and fourth regions 1204 and 1206 may have a same (common) ring shape and may concentrically surround the second region 1202, but example embodiments are not limited thereto. For example, the third and fourth regions may have different shapes and may partially surround different portions of the second region 1202.

It will be understood that the OLED display panel 1000 may include different quantities of regions than what is shown in FIG. 12. For example, the OLED display panel 1000 may be limited to a single region 1201 in which all pixels (Px) include identical configurations of OLED light emitters and visible light sensors. In another example, the OLED display panel 1000 may include a greater quantity of separate regions, each having separate sets of pixels (Px) that include separate, respective configurations of light emitters and light sensors, than as shown in FIG. 12. In another example, in some example embodiments, fourth region 1206 may be absent as a separate region, and the third region 1204 may extend entirely between the second region 1202 as shown in FIG. 12 and the edges E of the OLED display panel 1000.

Figure 13:
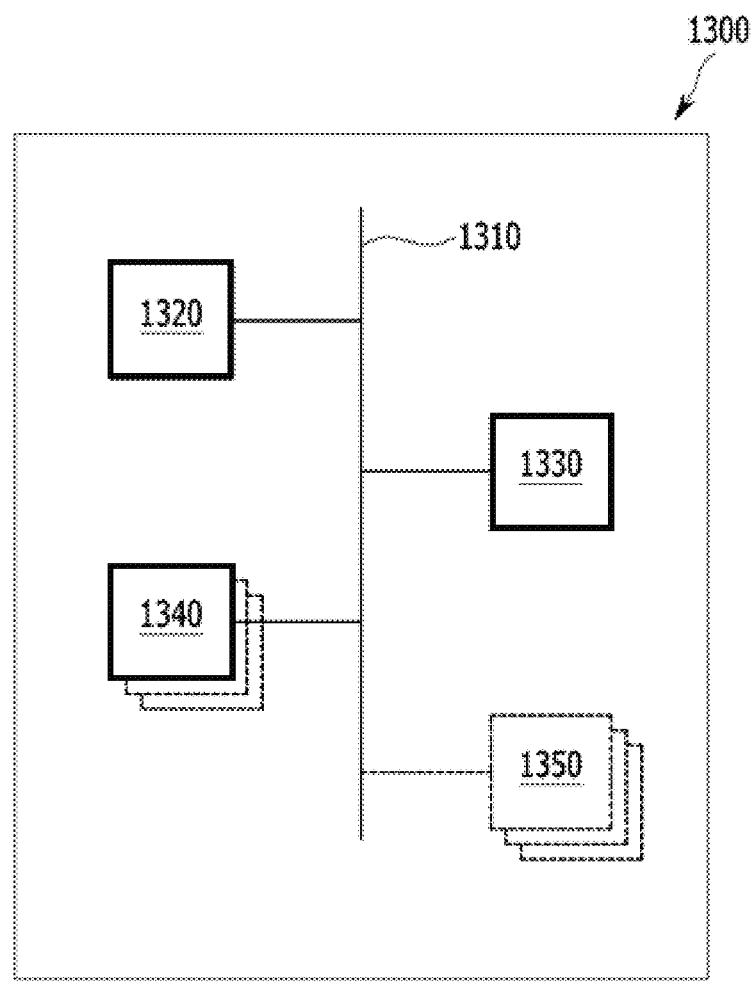
FIG. 13 is a diagram illustrating a display device that includes one or more visible light sensor embedded OLED display panels according to some example embodiments.

FIG. 13 is a diagram illustrating a display device that includes one or more visible light sensor embedded OLED display panels according to some example embodiments.

Referring to FIG. 13, display device 1300 includes a bus 1310, a processor 1320, a memory 1330, and one or more OLED display panels 1340. As shown, in some example embodiments, the display device 1300 may further include one or more additional devices 1350. The processor 1320, a memory 1330, and one or more OLED display panels 1340 (and where present, the one or more additional devices 1350) may communicate with one another through the bus 1310.

The one or more OLED display panels 1340 may each be any of the visible light sensor embedded OLED display panels included in any of the example embodiments.

The processor 1320 may include one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device, for example a solid state drive (SSD), storing a program of instructions, and a processor configured to execute the program of instructions to implement the functionality of the processor 1320 and/or one or more OLED display panels 1340.

Referring back to at least FIGS. 3-8, the processor 1320 may partially or entirely implement the functionality of the OLED display panels 1000 embedded with one or more visible light sensors 210 and/or 2210, including implementing some or all of the operations illustrated in the operation algorithm in the flowchart of FIG. 3, implementing operations of biometric recognition, for example fingerprint recognition by using of the visible light sensor embedded organic light emitting diode (OLED) display panel according to some example embodiments as shown in FIG. 4, and transmitting and/or receiving signals according to the timing diagram of FIG. 6. Accordingly, the processor 1320 may control display operations of the one or more OLED display panels 1340 to display one or more images and/or may control biometric recognition operations implemented based at least in part upon at least one or more light sensors embedded in one or more OLED display panels 1340.

The one or more additional devices 1350 may include one or more communication interfaces (e.g., wireless communication interface, wired interface), user interfaces (e.g., keypad, mouse, button, etc.), power supply and/or power supply interface, any combination thereof, or the like.

It will be understood that the memory 1330 may store a program of instructions and the processor 1320 may execute the stored program of instructions to implement functionality associated with the display device 1300 and/or one or more OLED display panels 1340, including performing one or more biometric recognition operations.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure has been described in connection with what is presently considered to be practical example embodiments, it is to be understood that the inventive concepts are not limited to the disclosed example embodiments, but, on the contrary, is intended to cover various modifications and equivalent arrangements included within the spirit and scope of the appended claims.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While at least one example embodiment have been particularly shown and described, it will be understood by one of ordinary skill in the art that variations in form and detail may be made therein without departing from the spirit and scope of the claims.

What is claimed is:

1. A display panel, comprising:
   a substrate;
   a driver stack on the substrate, the driver stack including a transistor array;
   a light emitter on the substrate and the driver stack, the light emitter configured to emit light; and
   a light sensor on the substrate and the driver stack, the light sensor configured to detect at least a portion of the emitted light based on reflection of the portion of the emitted light from a recognition target,
   wherein the light sensor is
     in a region adjacent to the light emitter so as to be horizontally aligned with the light emitter in a horizontal direction extending parallel to an upper surface of the substrate, or
     between the substrate and a region that is adjacent to the light emitter such that the light sensor is vertically aligned with the region in a vertical direction extending perpendicular to the upper surface of the substrate.

2. The display panel of claim 1, wherein the light sensor is a visible light sensor configured to absorb light in a wavelength spectrum of visible light.

3. The display panel of claim 2, wherein the visible light sensor includes an organic photodiode including an organic material.

4. The display panel of claim 3, wherein
   the organic photodiode includes a lower electrode, an upper electrode, and a visible light absorption layer between the lower and upper electrodes,
   the lower electrode is a reflecting electrode, and
   the upper electrode is a transparent electrode.

5. The display panel of claim 1, wherein the region adjacent to the light emitter is a non-light emitting region.

6. The display panel of claim 1, wherein the light emitter includes a visible light emitter stack, the visible light emitter stack including a plurality of sub-pixels including a red sub-pixel, a green sub-pixel, and a blue sub-pixel.

7. The display panel of claim 6, wherein the light sensor is partially overlapped with at least one visible light emitter stack in the vertical direction.

8. The display panel of claim 6, wherein
   the light emitter further includes an infrared light emitter configured to emit infrared light; and
   the light sensor includes an infrared light sensor configured to detect at least a portion of the emitted infrared light based on reflection of the portion of the emitted infrared light from the recognition target,
   wherein the infrared light sensor is
     in a separate region that is adjacent to the infrared light emitter, or
     between the substrate and a separate region that is adjacent to the infrared light emitter.

9. A display device comprising the display panel of claim 1.

10. A display panel, comprising:
    a substrate;
    a driver stack on the substrate, the driver stack including a transistor array;
    a light emitter stack on the substrate and the driver stack, the light emitter stack including a plurality of sub-pixels including a red sub-pixel, a green sub-pixel, and a blue sub-pixel, each of the red, green, and blue sub-pixels configured to emit light; and
    a light sensor on the substrate and the driver stack, the light sensor configured to detect at least a portion of the emitted light based on reflection of the portion of the emitted light from a recognition target,
    wherein
      the light sensor is horizontally aligned with at least one adjacent sub-pixel of the light emitter stack in a horizontal direction extending parallel to an upper surface of the substrate, or
      the light sensor is vertically aligned with a region that is adjacent to the light emitter stack in a vertical direction extending perpendicular to the upper surface of the substrate.

11. The display panel of claim 10, wherein the light sensor is a visible light sensor configured to absorb light in a wavelength spectrum of visible light.

12. The display panel of claim 11, wherein the visible light sensor includes an organic photodiode including an organic material.

13. The display panel of claim 12, wherein
    the organic photodiode includes a lower electrode, an upper electrode, and a visible light absorption layer between the lower and upper electrodes,
    the lower electrode is a reflecting electrode, and
    the upper electrode is a transparent electrode.

14. A display device comprising the display panel of claim 10.

15. A display panel, comprising:
    a substrate;
    a driver stack on the substrate, the driver stack including a transistor array;
    a light emitter stack on the substrate and the driver stack, the light emitter stack including a red sub-pixel, a green sub-pixel, and a blue sub-pixel, each of the red, green, and blue sub-pixels configured to emit light; and
    a light sensor on the substrate and the driver stack, the light sensor configured to detect at least a portion of the emitted light based on reflection of the portion of the emitted light from a recognition target, wherein the red sub-pixel, the green sub-pixel, the blue sub-pixel, and the light sensor are arranged in a horizontal direction extending parallel to an upper surface of the substrate.

16. The display panel of claim 15, wherein the light emitter stack is an OLED light emitter stack, and the light sensor includes an organic photodiode.

17. The display panel of claim 15, wherein each of the light emitter stack and the light sensor comprises an upper electrode and a lower electrode, the upper electrodes of the light emitter stack and the light sensor are formed with a transflective electrode, and the lower electrodes of the light emitter stack and the light sensor are formed with reflective electrode.

18. The display panel of claim 15, wherein the light sensor is in a non-light emitting region that is adjacent to at least one the red sub-pixel, the green sub-pixel, and the blue sub-pixel.

19. The display panel of claim 15, wherein the display panel includes a pattern of red sub-pixels, a pattern of green sub-pixels, and a pattern of blue sub-pixels, and one green sub-pixel in the pattern of green sub-pixels is replaced with the light sensor, such that the light sensor occupies a location of the one green sub-pixel in the pattern of the green sub-pixels.

20. A display device comprising the display panel of claim 15.

* * * * *

UNITED STATES PATENT AND TRADEMARK OFFICE
CERTIFICATE OF CORRECTION

PATENT NO. : 11,716,892 B2
APPLICATION NO. : 17/227845
DATED : August 1, 2023
INVENTOR(S) : Kyung Bae Park et al.

It is certified that error appears in the above-identified patent and that said Letters Patent is hereby corrected as shown below:

On the Title Page

Item (72), Line 4, should read as follows:
-- (72) Inventor: Chul Joon HEO --

Signed and Sealed this
Sixteenth Day of April, 2024

Katherine Kelly Vidal
*Director of the United States Patent and Trademark Office*